(12) United States Patent
Cho et al.

(10) Patent No.: US 11,397,598 B2
(45) Date of Patent: Jul. 26, 2022

(54) ELECTRONIC DEVICE FOR PERFORMING AUTHENTICATION BY USING MULTIPLE BIOMETRIC SENSORS AND OPERATION METHOD THEREOF

(71) Applicant: Samsung Electronics Co., Ltd., Suwon-si (KR)

(72) Inventors: Jinhoon Cho, Suwon-si (KR); Hyung-Woo Shin, Seoul (KR); Hyemi Lee, Seoul (KR); Pil-Joo Yoon, Seongnam-si (KR); Haedong Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 16/488,429

(22) PCT Filed: Feb. 22, 2018

(86) PCT No.: PCT/KR2018/002189
§ 371 (c)(1),
(2) Date: Aug. 23, 2019

(87) PCT Pub. No.: WO2018/155928
PCT Pub. Date: Aug. 30, 2018

(65) Prior Publication Data
US 2020/0004940 A1    Jan. 2, 2020

(30) Foreign Application Priority Data

Feb. 23, 2017 (KR) .................. 10-2017-0024257

(51) Int. Cl.
*G06F 9/451* (2018.01)
*G06F 3/0484* (2022.01)
(Continued)

(52) U.S. Cl.
CPC ............ *G06F 9/453* (2018.02); *G06F 3/0482* (2013.01); *G06F 3/0484* (2013.01);
(Continued)

(58) Field of Classification Search
CPC ...... G06F 21/32; G06F 21/316; G06F 3/0482; G06F 21/45; G06F 3/0484; G06F 21/36;
(Continued)

(56) References Cited

U.S. PATENT DOCUMENTS 11,062,003 B2 * 7/2021 Chang .................. G06V 10/143
2008/0122577 A1 5/2008 Gutta et al.
(Continued)

FOREIGN PATENT DOCUMENTS

CN 102737451 A * 10/2012 ............. G06F 21/32
CN 104408343 A 3/2015
(Continued)

OTHER PUBLICATIONS

Indian Office Action dated Feb. 18, 2021, issued in Indian Patent Application No. 201927038202.
(Continued)

*Primary Examiner* — Justin R. Blaufeld
(74) *Attorney, Agent, or Firm* — Jefferson IP Law, LLP

(57) ABSTRACT

The present invention relates to an electronic device for performing authentication by using biometric information and an operating method thereof, the electronic device comprising: a first biometric sensor for acquiring biometric information by a first method; a second biometric sensor for acquiring the biometric information or other biometric data by a second method; a display; and a processor, wherein the processor may be configured to acquire context information relating to the first method and the second method, select at least one method from the first method and the second method on the basis of at least a part of the context
(Continued)

information, and display at least one graphic object corresponding to the at least one authentication method through the display.

4 Claims, 30 Drawing Sheets

(51) Int. Cl.
    *G06F 21/32* (2013.01)
    *G06F 21/45* (2013.01)
    *H04M 1/72457* (2021.01)
    *H04M 1/72454* (2021.01)
    *H04M 1/72463* (2021.01)
    *G06F 3/0482* (2013.01)
    *G06F 21/31* (2013.01)
    *H04M 1/72472* (2021.01)
    *G06F 21/36* (2013.01)

(52) U.S. Cl.
    CPC ............ *G06F 21/316* (2013.01); *G06F 21/32* (2013.01); *G06F 21/45* (2013.01); *H04M 1/72454* (2021.01); *H04M 1/72457* (2021.01); *H04M 1/72463* (2021.01); *H04M 1/72472* (2021.01); *G06F 21/36* (2013.01)

(58) Field of Classification Search
    CPC .............. G06F 9/453; H04M 1/72472; H04M 1/72457; H04M 1/72454; H04M 1/72463
    See application file for complete search history.

(56) References Cited

U.S. PATENT DOCUMENTS

| | | | |
|---|---|---|---|
| 2010/0303311 A1* | 12/2010 | Shin | G06V 10/993 |
| | | | 382/124 |
| 2014/0157401 A1* | 6/2014 | Alameh | G06F 21/32 |
| | | | 726/17 |
| 2014/0282868 A1* | 9/2014 | Sheller | G06F 21/31 |
| | | | 726/3 |
| 2015/0071510 A1 | 3/2015 | Kim et al. | |
| 2015/0242601 A1 | 8/2015 | Griffiths et al. | |
| 2015/0242605 A1 | 8/2015 | Du et al. | |
| 2015/0324570 A1 | 11/2015 | Lee et al. | |
| 2017/0032168 A1* | 2/2017 | Kim | G06F 3/0362 |
| 2017/0064555 A1* | 3/2017 | Johansson | H04L 63/083 |
| 2017/0230362 A1* | 8/2017 | Wang | H04L 63/0861 |
| 2018/0189470 A1 | 7/2018 | Kim et al. | |
| 2019/0370448 A1* | 12/2019 | Devine | G06V 40/166 |

FOREIGN PATENT DOCUMENTS

| | | | | |
|---|---|---|---|---|
| CN | 105279410 A | | 1/2016 | |
| CN | 106055944 A | | 10/2016 | |
| CN | 106250738 A | | 12/2016 | |
| CN | 107194214 A | * | 9/2017 | ............ G06F 21/31 |
| EP | 2009596 B1 | * | 5/2010 | ............ G06F 21/32 |
| EP | 3 584 729 A1 | | 12/2019 | |
| KR | 10-2012-0122587 A | | 11/2012 | |
| KR | 10-2014-0127478 A | | 11/2014 | |
| KR | 10-2015-0029256 A | | 3/2015 | |
| KR | 10-2016-0116106 A | | 10/2016 | |
| KR | 10-2017-0004108 A | | 1/2017 | |
| WO | 2018/155928 A1 | | 8/2018 | |

OTHER PUBLICATIONS

European Search Report dated Nov. 4, 2019, issued in European Patent Application No. 18756747.4.

Chinese Office Action dated Dec. 20, 2021, issued in Chinese Patent Application No. 201880013657.8.

* cited by examiner

ELECTRONIC DEVICE FOR PERFORMING AUTHENTICATION BY USING MULTIPLE BIOMETRIC SENSORS AND OPERATION METHOD THEREOF

BACKGROUND ART

Various embodiments of the disclosure relate to an electronic device for supporting a plurality of biometric recognition methods, and an operating method thereof.

With the development of information and communication technology and semiconductor technology, various types of electronic devices are evolving into multimedia devices providing a diversity of multimedia services. For example, electronic devices can provide a variety of multimedia services, such as a broadcast service, a wireless Internet service, a camera service, and a music playback service.

As being used by an increasing number of users, electronic devices provide various user interfaces for users. For example, electronic devices provide an authentication screen for inputting user authentication information (e.g., fingerprint information, pattern information, password information, iris information, face information, and the like).

DISCLOSURE OF INVENTION

Technical Problem

An electronic device may authenticate a user on the basis of authentication information obtained using at least one biometric recognition sensor. For example, the electronic device may obtain a face image, a fingerprint image, an iris image, or the like as the authentication information and may compare the authentication information with a reference template as reference information used for authentication, thereby authenticating the user.

User authentication using the electronic device may be performed in various situations. However, an adverse effect may occur to the biometric recognition sensor during an authentication operation. Accordingly, the electronic device may obtain authentication information having a low similarity with that of the reference template, thus reducing the user authentication rate of the electronic device.

An electronic device and a method according to various embodiments of the disclosure may provide the recognition rate of a biometric recognition method on the basis of context information.

An electronic device and a method according to various embodiments of the disclosure may recommend a biometric recognition suitable for an authentication operation.

An electronic device according to various embodiments of the disclosure may include: a first biometric sensor configured to obtain biometric information using a first method; a second biometric sensor configured to obtain the biometric information or different biometric information using a second method; a display; and a processor, wherein the processor may be configured to: obtain context information associated with the first method and the second method; select at least one method of the first method and the second method on the basis of at least part of the context information; and display at least one graphic object corresponding to the at least one method for authentication.

An electronic device according to various embodiments of the disclosure may include: a first biometric sensor configured to obtain biometric information using a first method; a second biometric sensor configured to obtain the biometric information or different biometric information using a second method; a display; and a processor, wherein the processor may be configured to: obtain context information associated with the first method and the second method; identify a first success rate, at which authentication is successful with the biometric information to be obtained via the first method, and a second success rate, at which authentication is successful with the biometric information and the different biometric information to be obtained via the second method, on the basis of at least part of the context information; and display a graphic object corresponding to the first method and a graphic object corresponding to the second method on the display on the basis of at least part of the first success rate and the second success rate.

An operating method of an electronic device according to various embodiments of the disclosure may include: obtaining context information associated with a first biometric recognition method and a second biometric recognition method; identifying a first success rate, at which authentication is successful with biometric information to be obtained via the first biometric recognition method, and a second success rate, at which authentication is successful with biometric information to be obtained via the second biometric recognition method, on the basis of at least part of the context information; and displaying a graphic object corresponding to the first method and a graphic object corresponding to the second method on the basis of at least part of the first success rate and the second success rate.

BEST MODE FOR CARRYING OUT THE INVENTION

Figure 1:
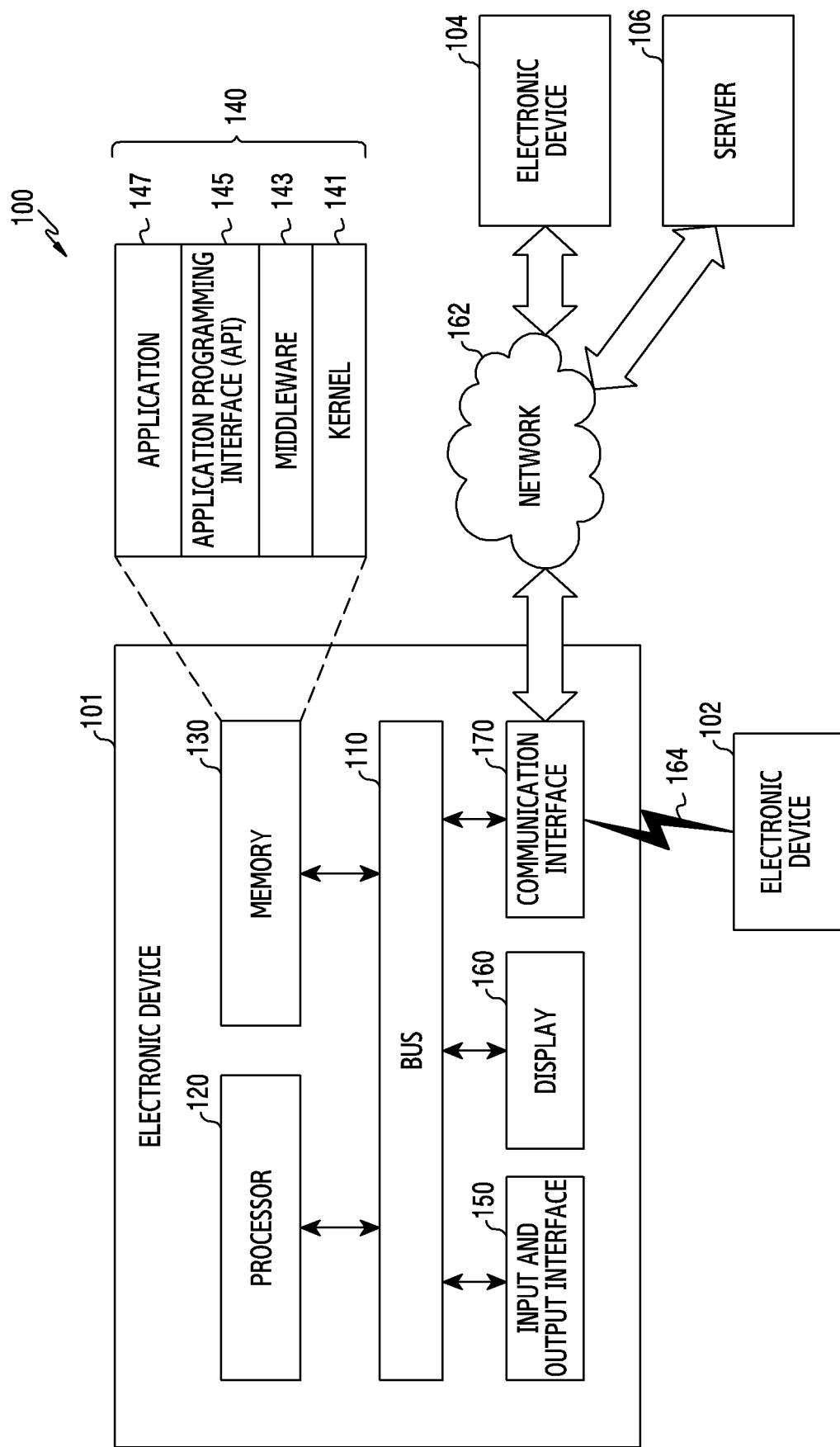
FIG. 1 illustrates an electronic device in a network environment according to various embodiments.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices.

In the present document, the term 'user' may denote a person who uses the electronic device or a device (e.g., an artificial-intelligent electronic device) which uses the electronic device.

Referring to FIG. 1, an electronic device 101 within a network environment 100 in various embodiments is described. The electronic device 101 may include a bus 110, a processor 120, a memory 130, an input output interface 150, a display 160, and a communication interface 170. In some embodiment, the electronic device 101 may omit at least one of the constituent elements or additionally have another constituent element.

The bus 110 may, for example, include a circuit coupling the constituent elements 110, 120, 150, 160 and 170 with one another and forwarding communication (e.g., a control message or data) between the constituent elements.

The processor 120 may include one or more of a central processing unit (CPU), an application processor (AP) or a communication processor (CP). The processor 120 may, for example, execute operation or data processing for control and/or communication of at least one another constituent element of the electronic device 101.

The memory 130 may include a volatile and/or non-volatile memory. The memory 130 may, for example, store a command or data related to at least one another constituent element of the electronic device 101.

According to an embodiment, the memory 130 may store a software and/or program 140. The program 140 may, for example, include a kernel 141, a middleware 143, an application programming interface (API) 145, an application program (or "application") 147, and the like. At least some of the kernel 141, the middleware 143 or the API 145 may be called an operating system (OS). The kernel 141 may, for example, control or manage system resources (e.g., bus 110, processor 120, memory 130, and the like) that are used for executing operations or functions implemented in other programs (e.g., middleware 143, API 145 or application program 147).

Also, the kernel 141 may provide an interface through which the middleware 143, the API 145 or the application program 147 may control or manage the system resources of the electronic device 101 by accessing the individual constituent element of the electronic device 101.

The middleware 143 may, for example, perform a relay role of enabling the API 145 or the application program 147 to communicate and exchange data with the kernel 141. Also, the middleware 143 may process one or more work requests that are received from the application program 147, in accordance with priority. For example, the middleware 143 may grant priority capable of using the system resources (e.g., the bus 110, the processor 120, the memory 130 or the like) of the electronic device 101 to at least one of the application programs 147, and process one or more work requests.

The API 145 is, for example, an interface enabling the application program 147 to control a function provided by the kernel 141 or the middleware 143 and may, for example, include at least one interface or function (e.g., an instruction) for file control, window control, image processing, character control or the like.

The input output interface 150 may forward a command or data inputted from a user or another external device, to another constituent element(s) of the electronic device 101, or output a command or data received from the another constituent element(s) of the electronic device 101, to the user or another external device.

The display 160 may, for example, include a liquid crystal display (LCD), a light emitting diode (LED) display, an organic light emitting diode (OLED) display, a microelectromechanical systems (MEMS) display or an electronic paper display. The display 160 may, for example, display various contents (e.g., a text, an image, a video, an icon, a symbol and/or the like) to a user. The display 160 may include a touch screen. And, for example, the display 160 may receive a touch, gesture, proximity or hovering input that uses an electronic pen or a part of the user's body.

The communication interface 170 may, for example, establish communication between the electronic device 101 and an external device (e.g., the first external electronic device 102, the second external electronic device 104 or the server 106). For example, the communication interface 170 may be coupled to a network 162 through wireless communication or wired communication, to communicate with the external device (e.g., the second external electronic device 104 or the server 106). The wireless communication may, for example, include a cellular communication that uses at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) and the like. According to an embodiment, the wireless communication may, for example, include at least one of wireless fidelity (WiFi), Bluetooth (BT), Bluetooth low energy (BLE), Zigbee, near field communication (NFC), magnetic secure transmission (MST), radio frequency (RF) or body area network (BAN). According to an embodiment, the wireless communication may include GNSS. The GNSS may, for example, be a global positioning system (GPS), a global navigation satellite system (Glonass), Beidou navigation satellite system (hereinafter, "Beidou")) or Galileo, the European global satellite-based navigation system. Hereinafter, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS), and the like.

The network 162 may include at least one of a telecommunications network, for example, a computer network (e.g., local area network (LAN) or wide area network (WAN)), the Internet or a telephone network.

Each of the first and second electronic devices 102 and 104 may be a device of the same or different type from that of the electronic device 101. According to various embodiments, all or some of operations executed in the electronic device 101 may be executed in another one electronic device or a plurality of electronic devices (e.g., the electronic devices 102 and 104 or the server 106). According to an embodiment, where the electronic device 101 performs some function or service automatically or in response to a request, the electronic device 101 may, instead of or additionally to executing the function or service in itself, send a request for execution of at least a partial function associated with this to another device (e.g., electronic device 102, 104 or server 106). The another electronic device (e.g., electronic device 102, 104 or server 106) may execute the requested function or additional function, and forward the execution result to the electronic device 101. The electronic device 101 may process the received result as it is or additionally, to provide the requested function or service. For this, a cloud computing, distributed computing or client-server computing technology may be used, for example.

Figure 2:
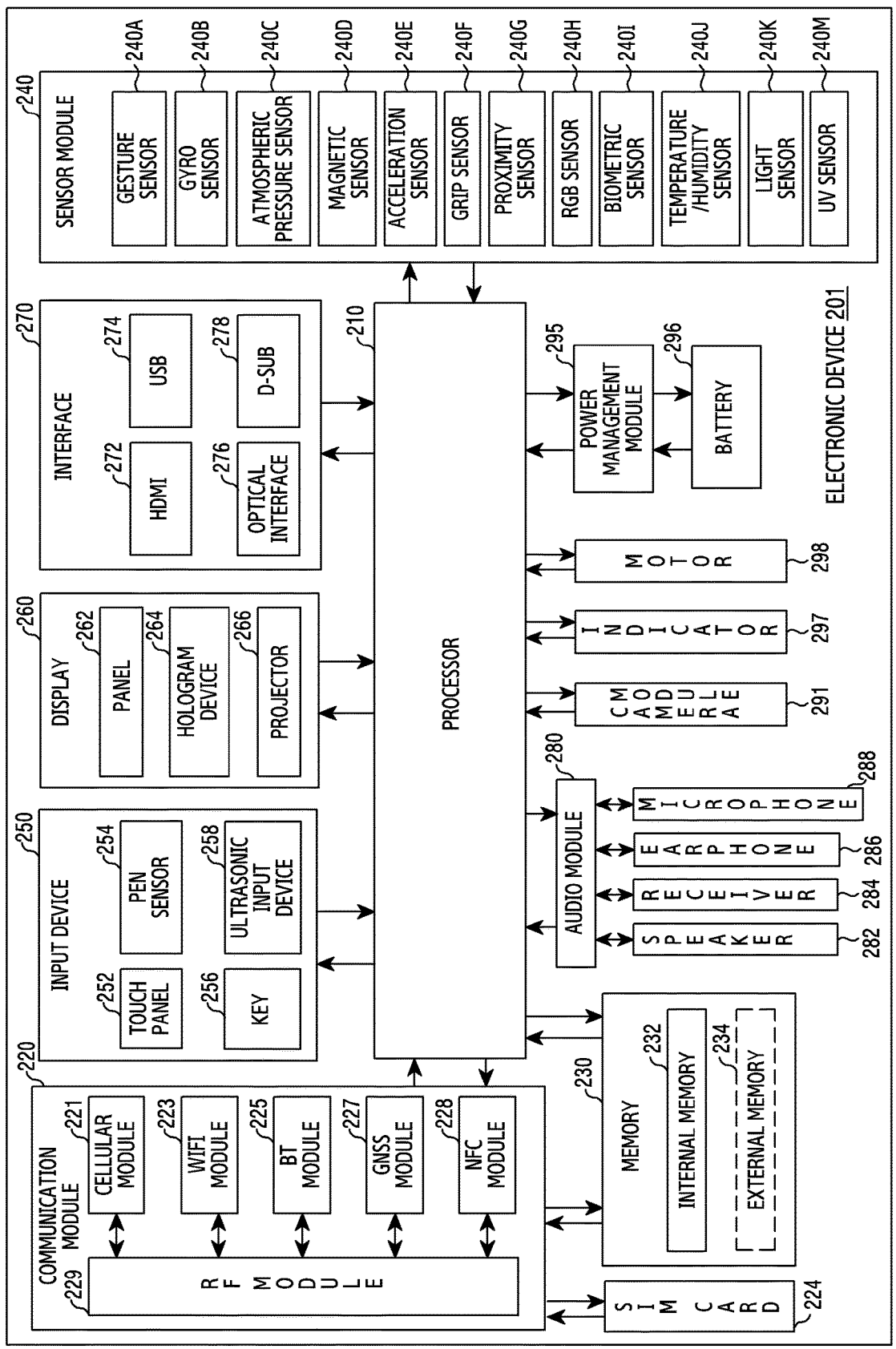
FIG. 2 is a block diagram illustrating an electronic device according to various embodiments.

FIG. 2 illustrates a block diagram of an electronic device according to an embodiment of the present disclosure.

Referring to FIG. 2, an electronic device 201 may, for example, include the entire or part of the electronic device 101 illustrated in FIG. 1. The electronic device 201 may include one or more processors (e.g., application processor (APs)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 may, for example, drive an operating system or an application program to control a majority of hardware or software constituent elements coupled to the processor 210, and may perform various data processing and operations. The processor 210 may be, for example, implemented as a system on chip (SoC). According to an embodiment, the processor 210 may further include a graphic processing unit (GPU) and/or an image signal processor (ISP).

The processor 210 may include at least some (e.g., cellular module 221) of the constituent elements illustrated in FIG. 2 as well. The processor 210 may load a command or data received from at least one of the other constituent elements (e.g., non-volatile memory), to a volatile memory, to process the loaded command or data, and store the result data in the non-volatile memory.

The communication module 220 may, for example, have the same or similar construction with the communication interface 170. The communication module 220 may, for example, include a cellular module 221, a WiFi module 223, a Bluetooth module 225, a GNSS module 227, a near field communication (NFC) module 228, and a radio frequency (RF) module 229. The cellular module 221 may, for example, provide voice telephony, video telephony, a text service, an Internet service or the like through a telecommunication network. According to an embodiment, the cellular module 221 may perform the distinction and authentication of the electronic device 201 within the telecommunication network, by using the subscriber identification module (e.g., SIM card) 224. According to an embodiment, the cellular module 221 may perform at least some functions among functions that the processor 210 may provide. According to an embodiment, the cellular module 221 may include a communication processor (CP). According to some embodiment, at least some (e.g., two or more) of the cellular module 221, the WiFi module 223, the Bluetooth module 225, the GNSS module 227 or the NFC module 228 may be included within one integrated chip (IC) or IC package. The RF module 229 may, for example, transceive a communication signal (e.g., RF signal). The RF module 229 may, for example, include a transceiver, a power amplifier module (PAM), a frequency filter, a low noise amplifier (LNA), an antenna or the like. According to another embodiment, at least one of the cellular module 221, the WiFi module 223, the Bluetooth module 225, the GNSS module 227 or the NFC module 228 may transceive an RF signal through a separate RF module.

The subscriber identification module 224 may, for example, include a card including a subscriber identification module and/or an embedded SIM. And, the subscriber identification module 224 may include unique identification information (e.g., integrated circuit card identifier (ICCID)) or subscriber information (e.g., international mobile subscriber identity (IMSI)).

The memory 230 (e.g., memory 130) may, for example, include an internal memory 232 or an external memory 234. The internal memory 232 may, for example, include at least one of a volatile memory (e.g., a dynamic random access memory (DRAM), a static RAM (SRAM), a synchronous dynamic RAM (SDRAM) or the like) and a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive or a solid state drive (SSD)). The external memory 234 may include a flash drive, for example, a compact flash (CF), a secure digital (SD), a micro-SD, a mini-SD, an extreme Digital (xD), a Multi Media Card (MMC), a memory stick or the like. The external memory 234 may be operatively or physically coupled with the electronic device 201 through various interfaces.

The sensor module 240 may, for example, measure a physical quantity or sense an activation state of the electronic device 201, to convert measured or sensed information into an electrical signal. The sensor module 240 may, for example, include at least one of a gesture sensor 240A, a gyro sensor 240B, a barometer 240C, a magnetic sensor 240D, an acceleration sensor 240E, a grip sensor 240F, a proximity sensor 240G, a color sensor 240H (e.g., a red, green, blue (RGB) sensor), a biometric (medical) sensor 240I, a temperature/humidity sensor 240J, an ambient light (illuminance) sensor 240K or an ultra violet (UV) sensor 240M. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor and/or a finger scan sensor. The sensor module 240 may further include a control circuit for controlling at least one or more sensors belonging therein. In some embodiment, the electronic device 201 may further include a processor configured to control the sensor module 240 as a part of the processor 210 or separately, thereby controlling the sensor module 240 while the processor 210 is in a sleep state.

The input device 250 may, for example, include a touch panel 252, a (digital) pen sensor 254, a key 256 or an ultrasonic input device 258. The touch panel 252 may, for example, use at least one scheme among a capacitive overlay scheme, a pressure sensitive scheme, an infrared beam scheme or an ultrasonic scheme. Also, the touch panel 252 may further include a control circuit as well. The touch panel 252 may further include a tactile layer, to provide a tactile response to a user. The (digital) pen sensor 254 may, for example, be a part of the touch panel 252, or include a separate sheet for recognition. The key 256 may, for example, include a physical button, an optical key or a keypad. The ultrasonic input device 258 may sense an ultrasonic wave generated in an input tool, through a microphone (e.g., microphone 288), to confirm data corresponding to the sensed ultrasonic wave.

The display 260 (e.g., the display 160) may include a panel 262, a hologram device 264, a projector 266, a display driver interface (DDI) 268, and/or a control circuit for controlling them. The panel 262 may, for example, be implemented to be flexible, transparent, or wearable. The panel 262 may be constructed as one or more modules together with the touch panel 252. The panel 262 may include a pressure sensor which may measure the strength of pressure of a user's touch. The pressure sensor may be implemented so as to be integrated with the touch panel 252 or may be implemented as one or more sensors separate from the touch panel 252.

The hologram device 264 may show a three-dimensional image to the air using an interference of light. The projector 266 may project light onto a screen, to display an image. The screen may, for example, be located inside or outside the electronic device 201.

The interface 270 may, for example, include an HDMI 272, a USB 274, an optical interface 276 or a D-subminiature (D-sub) 278. The interface 270 may, for example, be included in the communication interface 170 illustrated in FIG. 1. Additionally or alternatively, the interface 270 may, for example, include a Mobile High-definition Link (MHL) interface, an SD card/Multi Media Card (MMC) interface or an Infrared Data Association (IrDA) standard interface.

The audio module 280 may, for example, convert a sound and an electrical signal interactively. At least some constituent elements of the audio module 280 may be, for example, included in the input output interface 150 illustrated in FIG. 1. The audio module 280 may for example, process sound information that is inputted or outputted through a speaker 282, a receiver 284, an earphone 286, the microphone 288 or the like.

The camera module 291 is, for example, a device able to photograph a still image and a video. According to an embodiment, the camera module 291 may include one or more image sensors (e.g., front sensor or rear sensor), a lens, an image signal processor (ISP) or a flash (e.g., an LED, a xenon lamp or the like).

The power management module 295 may, for example, manage the electric power of the electronic device 201. According to an embodiment, the power management module 295 may include a power management integrated circuit (PMIC), a charger IC or a battery or fuel gauge. The PMIC may, for example, employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuit for wireless charging, for example, a coil loop, a resonance circuit, a rectifier or the like. The battery gauge may, for example, measure a level of the battery 296, a voltage being in charge, an electric current or a temperature.

The battery 296 may, for example, include a rechargeable battery and/or a solar battery.

The indicator 297 may display a specific state, for example, a booting state, a message state, a charging state or the like of the electronic device 201 or a part (e.g., processor 210) of the electronic device 201.

The motor 298 may convert an electrical signal into a mechanical vibration, and may generate a vibration, a haptic effect or the like. The electronic device 201 may, for example, include a mobile TV support device (e.g., GPU) capable of processing media data according to the standards of digital multimedia broadcasting (DMB), digital video broadcasting (DVB), mediaFlo™ or the like. Each of the constituent elements described in the present document may consist of one or more components, and a name of the corresponding constituent element may be varied according to the kind of the electronic device. In various embodiments, the electronic device (e.g., electronic device 201) may omit some constituent elements, or further include additional constituent elements, or combine some of the constituent elements to configure one entity, but identically perform functions of corresponding constituent elements before combination.

Figure 3:
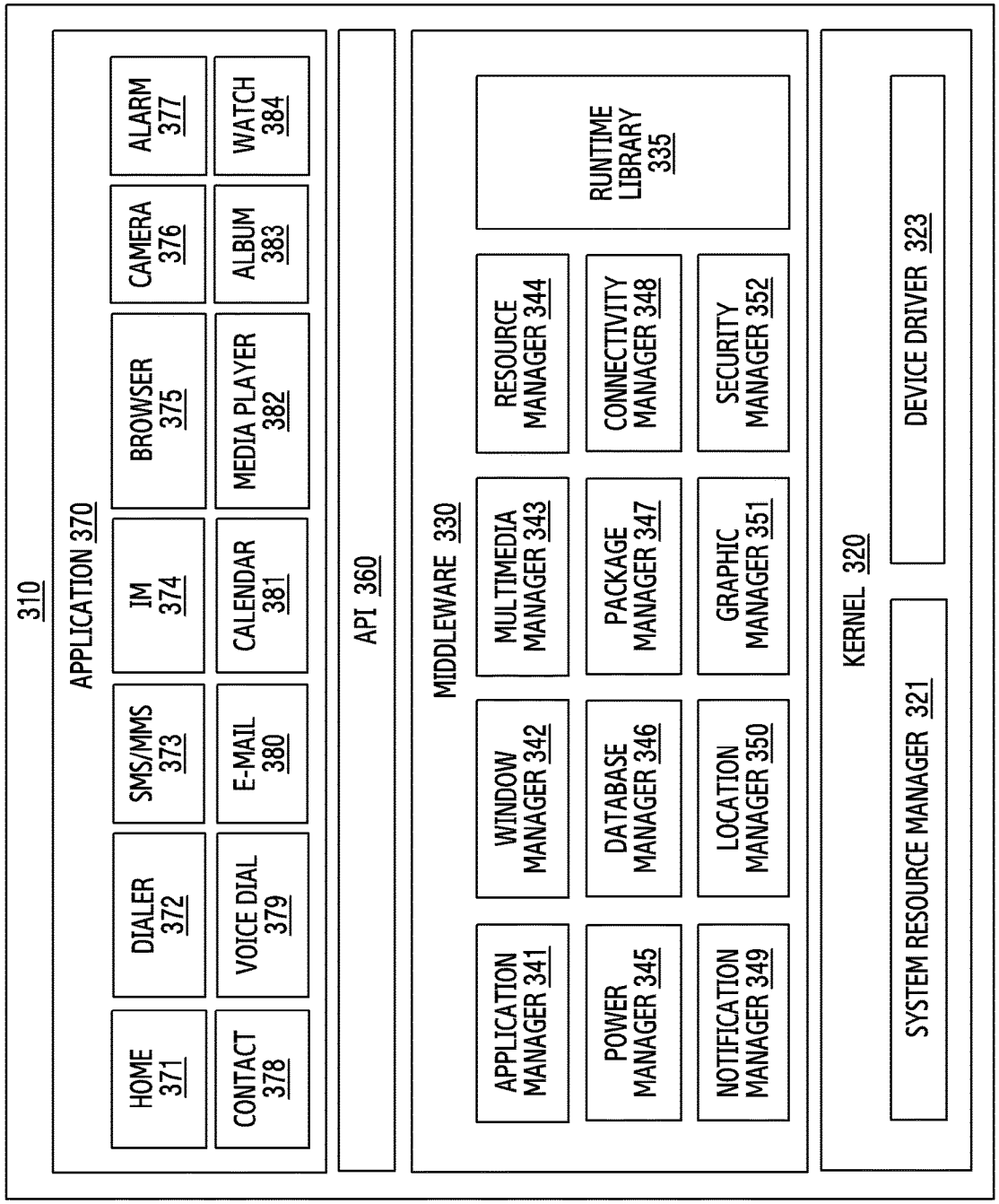
FIG. 3 is a block diagram illustrating a program module according to various embodiments.

FIG. 3 illustrates a block diagram of a program module according to various embodiments. According to an embodiment, the program module 310 (e.g., the program 140) may include an operating system (OS) controlling resources related to an electronic device (e.g., the electronic device 101) and/or various applications (e.g., the application program 147) run on the operating system. The operating system may, for example, include Android™, iOS™, Windows™, Symbian™, Tizen™, or Bada™.

Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloadable from an external electronic device (e.g., the electronic device 102 or 104, the server 106, etc.).

The kernel 320 may, for example, include a system resource manager 321 and/or a device driver 323. The system resource manager 321 may perform control of a system resource, allocation thereof, or recovery thereof. According to an embodiment, the system resource manager 321 may include a process management unit, a memory management unit, or a file system management unit. The device driver 323 may, for example, include a display driver, a camera driver, a Bluetooth driver, a shared memory driver, a USB driver, a keypad driver, a WiFi driver, an audio driver, or an inter-process communication (IPC) driver.

The middleware 330 may, for example, provide a function that the application 370 needs in common, or provide various functions to the application 370 through the API 360 wherein the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may, for example, include a library module that a compiler utilizes so as to add a new function through a programming language while the application 370 is executed. The runtime library 335 may perform input output management, memory management, or arithmetic function processing. The application manager 341 may, for example, manage a lifecycle of the application 370. The window manager 342 may manage a GUI resource which is used for a screen. The multimedia manager 343 may obtain a format used for playing media files, and perform encoding or decoding of the media file by using a codec suitable to the corresponding format. The resource manager 344 may manage a source code of the application 370 or a space of a memory. The power manager 345 may, for example, manage a battery capacity, temperature or power supply, and identify or provide power information used for an operation of an electronic device by using corresponding information among this. According to an embodiment, the power manager 345 may interwork with a basic input/output system (BIOS). The database manager 346 may, for example, provide, search or change a database that will be used in the application 370. The package manager 347 may manage the installing or refining of an application that is distributed in the form of a package file.

The connectivity manager 348 may, for example, manage wireless connectivity. The notification manager 349 may, for example, provide an event such as an arrival message, an appointment, a proximity notification, etc. to a user. The location manager 350 may, for example, manage location information of an electronic device. The graphic manager 351 may, for example, manage a graphic effect that will be provided to the user, or a user interface related with this. The security manager 352 may, for example, provide system security or user authentication.

According to an embodiment, the middleware 330 may include a telephony manager for managing a voice or video call function of the electronic device, or a middleware module capable of forming a combination of functions of the aforementioned constituent elements. According to an embodiment, the middleware 330 may provide a module that is specialized by type of an operating system. The middleware 330 may dynamically delete some of the existing constituent elements, or add new constituent elements.

The API 360 is, for example, a set of API programming functions, and may be provided to have another construction according to the operating system. For example, Android or iOS may provide one API set by platform, and Tizen may provide two or more API sets by platform.

The application 370 may, for example, include a home 371, a dialer 372, a short message service (SMS)/multimedia message service (MMS) 373, an instant message (IM) 374, a browser 375, a camera 376, an alarm 377, a contact 378, a voice dial 379, an electronic mail (e-mail) 380, a calendar 381, a media player 382, an album 383, a watch 384, a health care (e.g., measuring a momentum, a blood sugar or the like), or an environment information (e.g., air pressure, humidity, or temperature information) provision application. According to an embodiment, the application 370 may include an information exchange application capable of supporting information exchange between an electronic device and an external electronic device. The information exchange application may, for example, include a notification relay application for relaying specific information to the external electronic device, or a device management application for managing the external electronic device. For example, the notification relay application may relay notification information provided in another application of the electronic device, to the external electronic device, or receive notification information from the external electronic device and provide the received notification information to a user. The device management application may, for example, install, delete, or refine a function (e.g., turned-on/turned-off of the external electronic device itself (or some components) or adjustment of a brightness (or resolution) of a display) of the external electronic device which communicates with the electronic device, or an application which operates in the external electronic device. According to an embodiment, the application 370 may include an application (e.g., a health care application of a mobile medical instrument) designated according to properties of the external electronic device. According to an embodiment, the application 370 may include an application received from the external electronic device. At least a part of the program module 310 may be implemented (e.g., executed) as software, firmware, hardware (e.g., the processor 210), or a combination of at least two or more of them, and may include a module for performing one or more functions, a program, a routine, sets of instructions or a process.

The term "module" used in the document may include a unit consisting of hardware, software or firmware, and may be, for example, used interchangeably with the term "logic", "logic block", "component", "circuitry" or the like. The "module" may be an integrally configured component or the minimum unit performing one or more functions or a part thereof. The "module" may be implemented mechanically or electronically, and may, for example, include an application-specific integrated circuit (ASIC) chip, a field-programmable gate array (FPGA) or a programmable logic device, which has been known or will be developed in future, performing some operations. At least a part of an apparatus (e.g., modules or functions thereof) or method (e.g., operations) according to various embodiments may, for example, be implemented as an instruction which is stored in a computer-readable storage medium (e.g., the memory 130) in the form of a program module. In response to the instruction being executed by a processor (e.g., the processor 120 of FIG. 1), the processor may perform a function corresponding to the instruction. The computer-readable recording medium may include a hard disk, a floppy disk, a magnetic medium (e.g., a magnetic tape), an optical recording medium (e.g., a compact disk-read only memory (CD-ROM), a digital versatile disk (DVD)), a magneto-optical medium (e.g., a floptical disk), an internal memory, etc. The instruction may include a code which is made by a compiler or a code which is executable by an interpreter. The module or program module according to various embodiments may include at least one or more of the aforementioned constituent elements, or omit some of them, or further include another constituent element. Operations carried out by the module, the program module or the another constituent element according to various embodiments may be executed in a sequential, parallel, repeated or heuristic manner, or at least some operations may be executed in different order or may be omitted, or another operation may be added.

Figure 4:
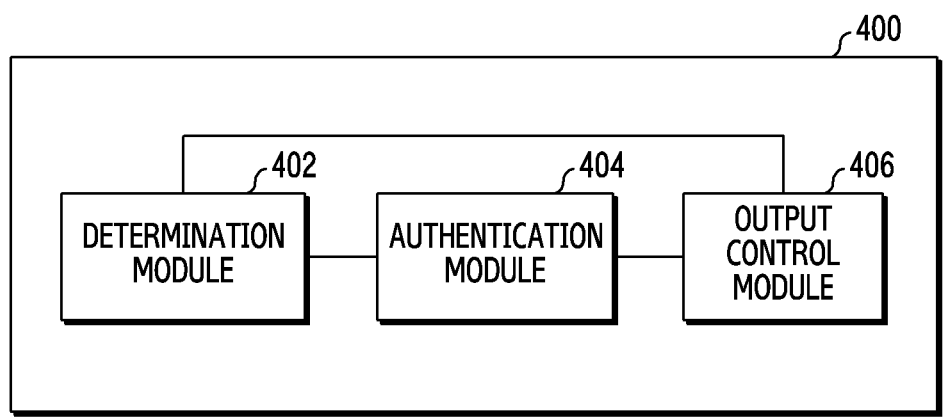
FIG. 4 illustrates the configuration of a processor according to various embodiments of the disclosure.

FIG. 4 illustrates the configuration of a processor 400 according to various embodiments of the disclosure. According to one embodiment, the processor 400 may be a processor (e.g., the processor 120 or 210) of an electronic device (e.g., the electronic device 101 or the electronic device 201).

Referring to FIG. 4, the processor 400 may include a determination module 402, an authentication module 404, and an output control module 406.

According to various embodiments, the determination module 402 may determine the authentication suitability of at least one biometric recognition method (or biometric recognition sensor). Authentication suitability may be a value indicating the degree to which a biometric recognition method is suitable to be used for user authentication. For example, authentication suitability may include the success rate at which authentication is successful with information to be obtained via a biometric recognition method. According to one embodiment, the determination module 402 may obtain context information associated with each biometric recognition method available for authentication using a plurality of sensors (e.g., the sensor module 240 of FIG. 2) of the electronic device. Further, the determination module 402 may determine the authentication suitability of each biometric recognition method on the basis of the context information associated with each biometric recognition method. For example, when it is determined that authentication information unsuitable for authentication may be obtained by at least one biometric recognition method, the determination module 402 may determine that the authentication suitability of the at least one biometric recognition method is low on the basis of context information. Further, when it is determined that authentication information suitable for authentication may be obtained by at least one biometric recognition method, the determination module 402 may determine that the authentication suitability of the at least one biometric recognition method is high on the basis of context information.

For example, the determination module 402 may collect context information associated with at least one of external illuminance information of the electronic device, a movement of the electronic device, and the orientation of the electronic device in order to determine the authentication suitability of a face authentication method. For example, when the processor 400 uses the face authentication method in a state where an illuminance is darker than a predefined brightness, authentication information including noise may be obtained through an image sensor. Accordingly, the determination module 402 may determine the illuminance to be darker than the predefined brightness as context information in which unsuitable authentication information may be obtained. Further, when the processor 400 uses the face authentication method in a state where a movement of the electronic device greater than a predefined movement occurs, authentication information having the contour of a face which is not clear may be obtained through the image sensor. Accordingly, the determination module 402 may determine the movement of the electronic device to be greater than the predefined movement as context information in which unsuitable authentication information may be obtained. In addition, when the processor 400 uses the face authentication method in a state where the orientation of the electronic device is out of a predefined angle, authentication information having a face which does not look forward may be obtained through the image sensor. Accordingly, the determination module 402 may determine the orientation of the electronic device which is out of the predefined angle as context information in which unsuitable authentication information may be obtained.

In another example, the determination module 402 may collect context information associated with at least one of illuminance information, movement information about the electronic device, and orientation information about the electronic device in order to determine the authentication suitability of an iris authentication method. As described above, the determination module 402 may determine the illuminance to be darker than the predefined brightness, a movement of the electronic device greater than the predefined movement, and the orientation of the electronic device which is out of the predefined angle as context information in which unsuitable authentication information may be obtained. Further, when the processor 400 uses the iris authentication method in a state where an illuminance exceeds the predefined brightness, authentication information having an iris narrowed by an expanded pupil may be obtained through an iris sensor. Accordingly, the determination module 402 may determine the illuminance exceeding the predefined brightness as context information in which unsuitable authentication information may be obtained.

In still another example, the determination module 402 may collect context information associated with a state where a fingerprint sensor is damaged or the fingerprint sensor is stained with foreign material in order to determine the authentication suitability of a fingerprint authentication method. For example, when the processor 400 uses the fingerprint authentication method in the state where the fingerprint sensor is damaged or the fingerprint sensor is stained with foreign material, a distorted fingerprint image may be obtained or a fingerprint image may not be obtained through the fingerprint sensor. Accordingly, the determination module 402 may determine the state where the fingerprint sensor is damaged or the fingerprint sensor is stained with foreign material as context information in which unsuitable authentication information may be obtained. For example, when at least one reception (RX) line (e.g., a sensing electrode) receives a signal with a specified sensitivity or less or receives no signal with respect to a signal of at least one transmission (TX) line (e.g., a driver electrode) of the fingerprint sensor, the determination module 402 may determine that the fingerprint sensor is damaged. In addition, when a reference level of charges or less is continuously detected for a certain time at the intersection of at least one transmission (TX) line and at least one reception (RX) line of the fingerprint sensor, the determination module 402 may determine that the fingerprint sensor is stained with foreign material.

According to various embodiments, the determination module 402 may determine guide information for improving the recognition rate for at least one biometric recognition method by which user authentication has failed. According to one embodiment, the determination module 402 may determine guide information for removing or reducing a negative environmental factor that has affected an authentication operation during the authentication operation.

For example, the processor 400 may fail user authentication when authentication information is distorted by at least one of the illuminance information, the movement information about the electronic device, and the orientation information about the electronic device which does not satisfy a predefined condition while the authentication operation is performed. Accordingly, the determination module 402 may determine at least one piece of information which does not satisfy the predefined condition as a negative environmental factor. In another example, the processor 400 may fail user authentication when a body part (e.g., a face or an iris) used for authentication is screened by an object (e.g., glasses, sunglasses, a hat, or lenses) and thus is not recognized. Accordingly, the determination module 402 may determine the object screening the body part as a negative environmental element. In still another example, when the authentication operation is performed in a state where a biometric recognition sensor is damaged or the fingerprint sensor is stained with foreign material, authentication information for user authentication may be distorted or may not be obtained, and thus the processor 400 may fail user authentication. Accordingly, the determination module 402 may determine the state where the biometric recognition sensor is damaged or the biometric recognition sensor is stained with foreign material as a negative environmental factor. In addition, when a predefined area or less of an object to be authenticated (e.g., a body part) touches the biometric recognition sensor, when the object to be authenticated does not touch the biometric recognition sensor for a predefined period of time, or when an object to be authenticated which is stained with foreign material touches the biometric recognition sensor, authentication information for user authentication may be distorted or may not be obtained, and thus the processor 400 may fail user authentication. Accordingly, the determination module 402 may determine a state where authentication information of the predefined area or less is obtained, a state where authentication information is not recognized for the predefined period of time, or a state where authentication information including foreign material is obtained as a negative environmental factor.

According to various embodiments, the authentication module 404 may perform an authentication operation for user authentication. According to one embodiment, the authentication module 404 may obtain authentication information using at least one biometric recognition method. For example, the authentication module 404 may obtain authentication information using a first biometric recognition method. In addition, the authentication module 404 may obtain authentication information using a second biometric recognition method different from the first biometric recognition method. For example, the authentication module 404 may perform an authentication operation of obtaining a reference template associated with a biometric recognition method selected for authentication from among reference templates corresponding to various stored biometric recognition methods and comparing the reference template with authentication information.

According to various embodiments, the output control module 406 may output the authentication suitability of a biometric recognition method available for authentication. According to one embodiment, the output control module 406 may output an object corresponding to a biometric recognition method. In addition, the output control module 406 may change the attributes of an object corresponding to at least one biometric recognition method on the basis of authentication suitability. For example, the output control module 406 may change the attributes (e.g., brightness, chroma, contrast, size, or shape) of the object so that a biometric recognition method having a certain level (e.g., an authentication-possible level) of authentication suitability is distinguished from a biometric recognition method not having the certain level of authentication suitability. For example, the output control module 406 may output an object corresponding to the biometric recognition method having the certain level of authentication suitability in a highlighted manner. Further, the output control module 406 may output guide information for improving the recognition rate of at least one biometric recognition method by which user authentication has failed.

An electronic device according to various embodiments of the disclosure may include: a first biometric sensor configured to obtain biometric information using a first method; a second biometric sensor configured to obtain the biometric information or different biometric information using a second method; a display; and a processor. The processor may be configured to: obtain context information associated with the first method and the second method; select at least one method of the first method and the second method on the basis of at least part of the context information; and display at least one graphic object corresponding to the at least one method for authentication.

According to one embodiment, the processor may be configured to obtain external environment information of the electronic device using the first biometric sensor, the second biometric sensor, or a sensor capable of detecting external light of the electronic device which is functionally connected to the electronic device in at least part of an operation of obtaining the context information. For example, the external environment information of the electronic device may include illuminance information.

According to one embodiment, the sensor capable of detecting the external light of the electronic device may include at least one of an illumination sensor and an image sensor.

According to one embodiment, the processor may be configured to obtain attribute information about a function running in the electronic device in least part of an operation of obtaining the context information.

According to one embodiment, the processor may be configured to: identify a first success rate, at which authentication is successful with the biometric information to be obtained via the first method, and a second success rate, at which authentication is successful with the biometric information or the different biometric information to be obtained via the second method, on the basis of at least part of the context information; and change a display attribute of the at least one graphic object on the basis of at least part of the first success rate and the second success rate.

According to one embodiment, when at least one success rate of the first success rate and the second success rate is within a pre-specified range, the processor may be configured to display guide information for enabling the at least one success rate to satisfy a different specified range.

An electronic device according to various embodiments of the disclosure may include: a first biometric sensor configured to obtain biometric information using a first method; a second biometric sensor configured to obtain the biometric information or different biometric information using a second method; a display; and a processor. The processor may be configured to: obtain context information associated with the first method and the second method; identify a first success rate, at which authentication is successful with the biometric information to be obtained via the first method, and a second success rate, at which authentication is successful with the biometric information and the different biometric information to be obtained via the second method, on the basis of at least part of the context information; and display a graphic object corresponding to the first method and a graphic object corresponding to the second method on the display on the basis of at least part of the first success rate and the second success rate.

According to one embodiment, the processor may be configured to display guide information for enabling at least one success rate which does not satisfy a specified value among the first success rate and the second success rate to satisfy the specified value.

According to one embodiment, the processor may be configured to obtain context information associated with at least one of external environment information of the electronic device, movement information of the electronic device, orientation information of the electronic device, and an operation state of the first biometric sensor and the second biometric sensor. For example, the environment information may include illuminance information.

According to one embodiment, the processor may be configured to perform an authentication operation using the first method or the second method selected via the graphic objects.

According to one embodiment, the electronic device may further include a memory configured to store a first reference template associated with the first method and a second reference template associated with the second method. The processor may be configured to obtain a reference template corresponding to the selected method from the memory.

According to one embodiment, the processor may be configured to display notification information when the first method or the second method which does not satisfy a pre-specified success rate is used for authentication.

According to one embodiment, the processor may be configured to: obtain context information associated with the first method or the second method by which authentication fails; and display guide information for improving a success rate on the basis of at least part of the context information.

According to one embodiment, the processor may be configured to control an operation of the first biometric sensor or the second biometric sensor on the basis of at least part of the first success rate and the second success rate.

Figure 5:
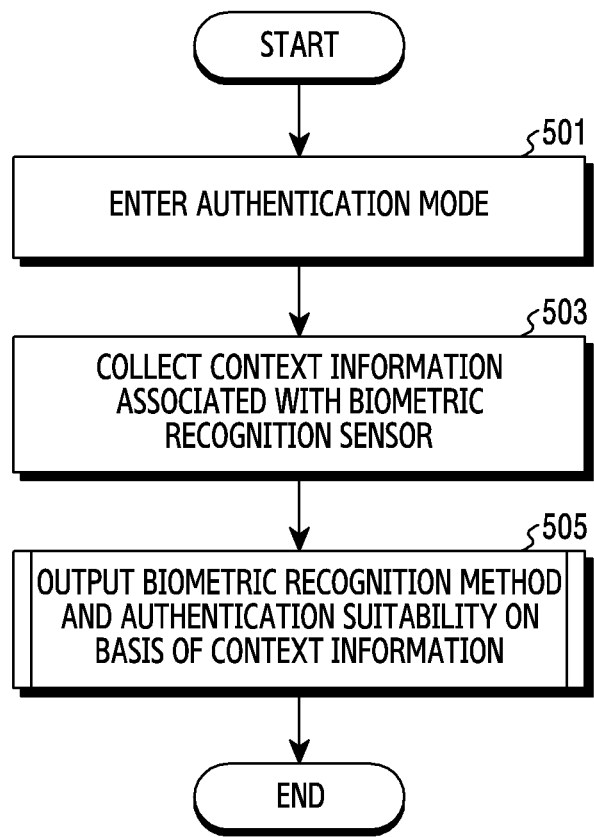
FIG. 5 is a flowchart illustrating a procedure for performing an authentication operation of an electronic device according to various embodiments of the disclosure.

FIG. 5 is a flowchart illustrating a procedure for performing an authentication operation of the electronic device 101 (e.g., the processor 400) according to various embodiments of the disclosure.

Referring to FIG. 5, in operation 501, the electronic device 101 (e.g., the output control module 406) may enter an authentication mode. According to one embodiment, the electronic device 101 may enter the authentication mode by outputting a screen for requesting an authentication operation. For example, the electronic device 101 may enter the authentication mode in a lock function-enabled state (or a lock state).

In operation 503, the electronic device 101 (e.g., the determination module 402) may collect context information associated with a biometric recognition method (or a biometric recognition sensor) used for authentication on the basis of at least one sensor (e.g., an illumination sensor, an acceleration sensor, a geomagnetic sensor, a gyro sensor, or the like). According to one embodiment, when a plurality of biometric recognition methods (e.g., a face recognition method, an iris recognition method, a fingerprint recognition method, and the like) can be used for authentication, the electronic device 101 may collect context information associated with each biometric recognition method. For example, the electronic device 101 may collect context information associated with at least one of external illuminance information of the electronic device 101, orientation and movement information about the electronic device 101, and operation state information of the biometric recognition sensor.

In operation 505, the electronic device 101 (e.g., the determination module 402 or the output control module 406) may output the authentication suitability of a biometric recognition method that can be used for authentication on the basis of the collected context information. According to one embodiment, authentication suitability may be a value indicating the degree to which a biometric recognition method is suitable to be used for user authentication.

For example, when it is determined that authentication information unsuitable for authentication may be obtained by at least one biometric recognition method, the electronic device 101 may determine that the authentication suitability of the at least one biometric recognition method is low. Accordingly, the electronic device 101 may output the authentication suitability of the biometric recognition method using an object indicating low authentication suitability. Further, when it is determined that authentication information suitable for authentication may be obtained by at least one biometric recognition method, the electronic device 101 may determine that the authentication suitability of the at least one biometric recognition method is high. Accordingly, the electronic device 101 may output the authentication suitability of the biometric recognition method using an object indicating high authentication suitability. In addition, the electronic device 101 may output authentication suitability in a graphic form, an audio form, a vibration form, or the like.

In another example, the electronic device 101 may output the authentication suitability of only at least one biometric recognition method that is determined as a method by which authentication information suitable for authentication may be obtained among biometric recognition methods that can be used for authentication. For example, the electronic device 101 may select a biometric recognition method having the highest authentication suitability and may output the authentication suitability of the selected biometric recognition method.

Figure 6:
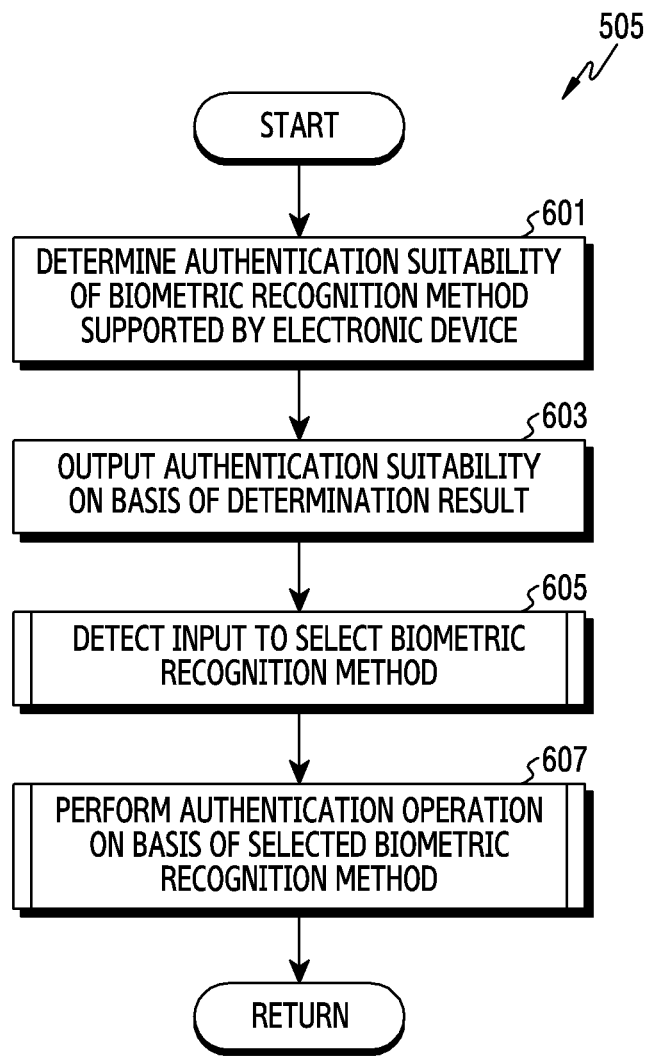
FIG. 6 is a flowchart illustrating a procedure for performing an authentication operation of an electronic device according to various embodiments of the disclosure.
Figure 7:
FIG. 7 shows an example illustrating an authentication procedure according to various embodiments of the disclosure.

FIG. 6 is a flowchart illustrating a procedure for performing an authentication operation of the electronic device 101 (e.g., the processor 400) according to various embodiments of the disclosure. FIG. 7 shows an example illustrating an authentication procedure according to various embodiments of the disclosure. According to one embodiment, the procedure for performing the authentication operation may include a detailed operation of operation 505 illustrated in FIG. 5.

According to various embodiments, the electronic device 101 may output the authentication suitability of a biometric recognition method supported by the electronic device 101 and may select a biometric recognition method to use for an authentication operation on the basis of user input.

Referring to FIG. 6, in operation 601, the electronic device 101 (e.g., the determination module 402) may determine the authentication suitability of each biometric recognition method supported by the electronic device 101. According to one embodiment, the electronic device 101 may determine the authentication suitability of an activated biometric recognition method specified by the user to be executed upon entering the authentication mode and the authentication suitability of a deactivated biometric recognition method not specified by the user. For example, the electronic device 101 may determine the authentication suitability of each biometric recognition method on the basis of at least one of external illuminance information of the electronic device 101, a movement of the electronic device 101, the orientation of the electronic device 101, and an operation state of a biometric recognition sensor (e.g., whether the biometric recognition sensor is damaged).

In operation 603, the electronic device 101 (e.g., the determination module 402 or the output control module 406) may output the authentication suitability on the basis of the determination result. According to one embodiment, the electronic device 101 may output the authentication suitability so that the user can recognize a biometric recognition method suitable for authentication and a biometric recognition method unsuitable for authentication before the authentication operation is performed. For example, the electronic device 101 may output an object corresponding to each biometric recognition method supported by the electronic device 101. In addition, the electronic device 101 may change the attributes of the object on the basis of the authentication suitability so that a biometric recognition method having a certain level of authentication suitability is distinguished from a biometric recognition method not having the certain level of authentication suitability. Further, the electronic device 101 may change the attributes of the object so that the activated biometric recognition method is distinguished from the deactivated biometric recognition method. For example, as illustrated in FIG. 7, the electronic device 101 may apply (700) an effect such that a biometric recognition method having high authentication suitability (e.g., an iris recognition method 702) is more highlighted than a biometric recognition method having low authentication suitability (e.g., a fingerprint recognition method 704 or a face recognition method 706). Further, the electronic device 101 may apply a solid line effect to the activated biometric recognition method (e.g., the iris recognition method 702 and the fingerprint recognition method 704) to be distinguished from the deactivated biometric recognition method (e.g., the face recognition method 706) to which a dotted line effect is applied. According to various embodiments, the electronic device 101 may distinctively display biometric recognition methods by changing at least one of the color, contrast, shape, size, position, and transparency of the object at least on the basis of the authentication suitability.

In operation 605, the electronic device 101 (e.g., the determination module 402 or the authentication module 404) may detect input to select a biometric recognition method. According to one embodiment, the electronic device 101 may detect input to select at least one biometric recognition method for authentication (e.g., unlocking) among the biometric recognition methods supported by the electronic device 101.

In operation 607, the electronic device 101 (e.g., the authentication module 404) may perform an authentication operation on the basis of the at least one selected biometric recognition method. According to one embodiment, the electronic device 101 may obtain authentication information using a biometric recognition sensor corresponding to the at least one selected biometric recognition method. For example, when an object associated with face recognition is selected from among output objects, the electronic device 101 may operate an image sensor to obtain authentication information including the face of the user. In addition, when an object associated with fingerprint recognition is selected from among the output objects, the electronic device 101 may operate a fingerprint sensor to obtain authentication information including a fingerprint of the user. Furthermore, when an object associated with iris recognition is selected from among the output objects, the electronic device 101 may operate an iris sensor to obtain authentication information including the iris of the user. For example, the electronic device 101 may perform an authentication operation of comparing authentication information obtained using a biometric recognition sensor with a stored reference template.

Figure 8:
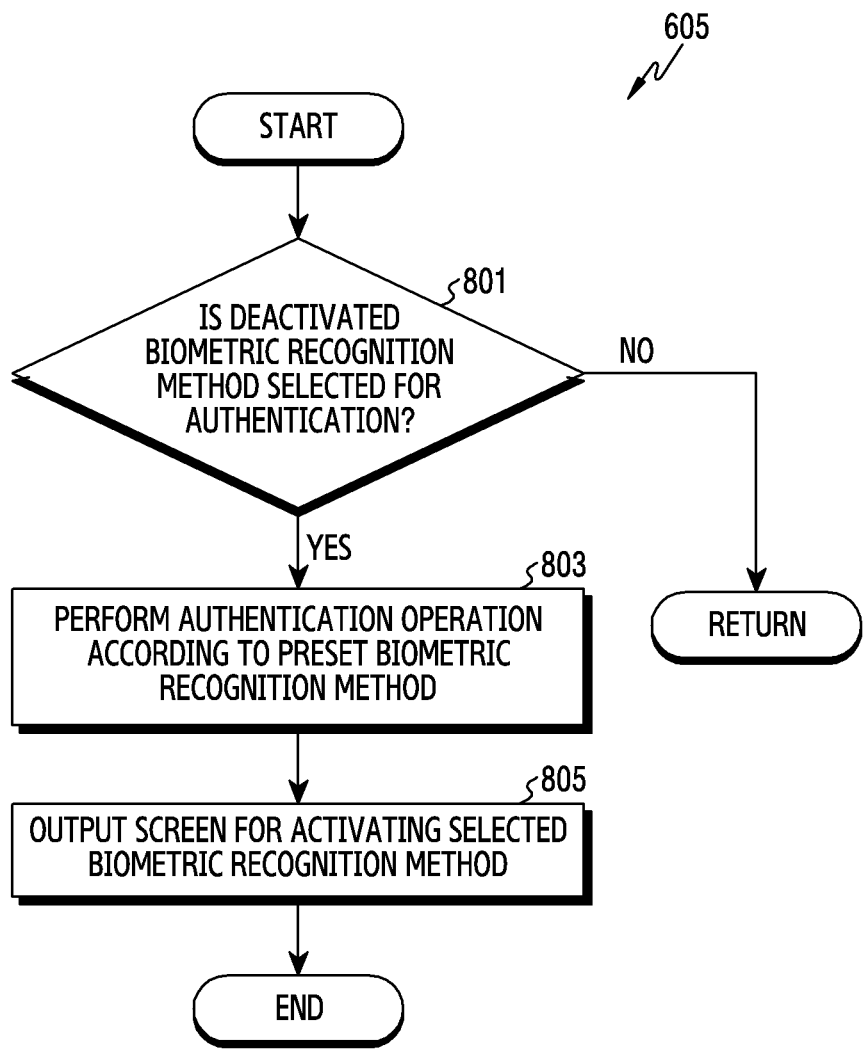
FIG. 8 is a flowchart illustrating a procedure in which an electronic device processes authentication through a selected biometric recognition method according to various embodiments of the disclosure.
Figure 9A:
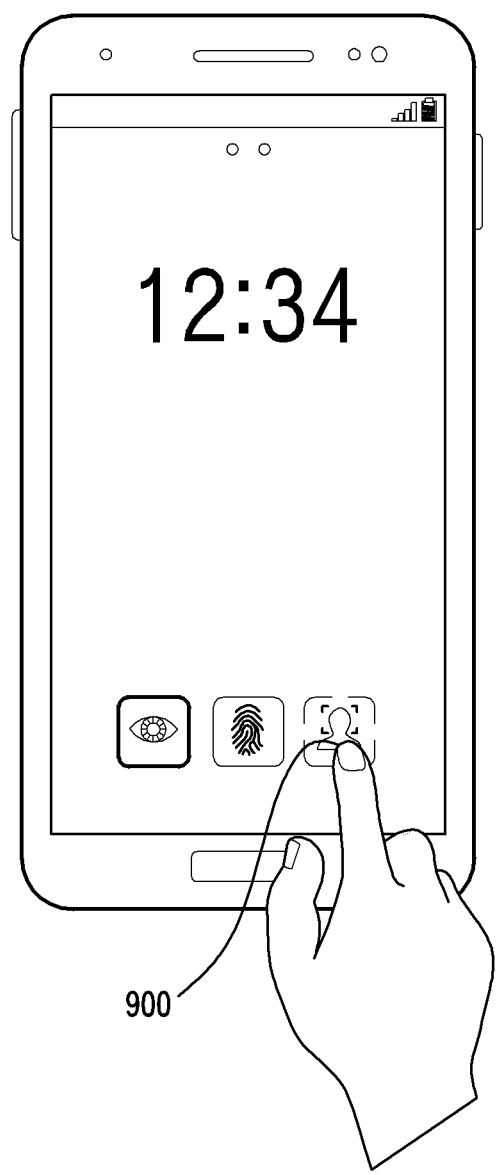
FIG. 9A and FIG. 9B show examples illustrating a procedure for processing a biometric recognition method according to various embodiments of the disclosure.
Figure 9B:
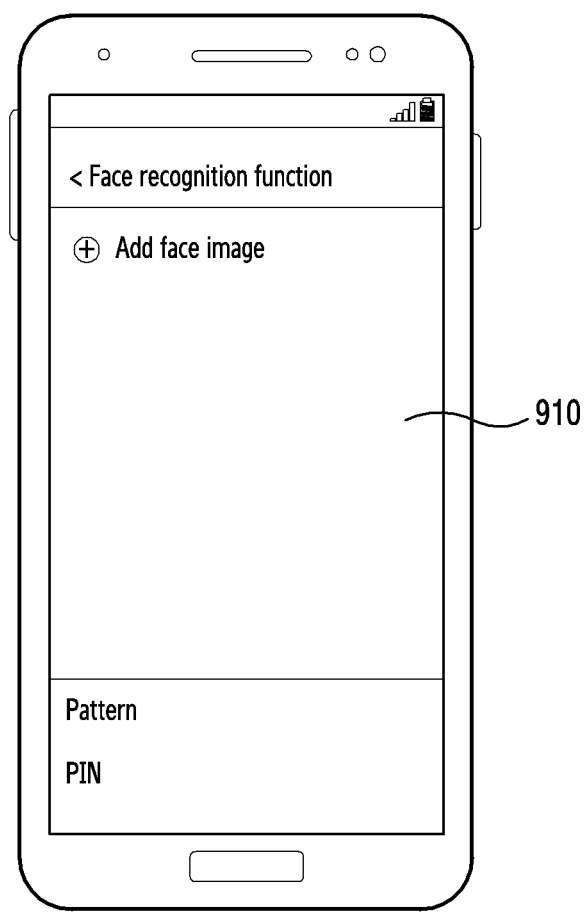

FIG. 8 is a flowchart illustrating a procedure in which the electronic device 101 (e.g., the processor 400) processes authentication through a selected biometric recognition method according to various embodiments of the disclosure. FIG. 9A and FIG. 9B show examples illustrating a procedure for processing a biometric recognition method according to various embodiments of the disclosure. According to one embodiment, an operation of processing a biometric recognition method may include a detailed operation of operation 605 illustrated in FIG. 6.

According to various embodiments, with authentication suitability output, the electronic device 101 may register at least one biometric recognition method as an activated biometric recognition method.

Referring to FIG. 8, in operation 801, the electronic device 101 (e.g., the determination module 402 or the authentication module 404) may determine whether an activated biometric recognition method specified by a user is selected for authentication. According to one embodiment, the electronic device 101 may determine whether to perform an authentication operation using the activated biometric recognition method specified by the user to be executed upon entering the authentication mode.

When the activated biometric recognition method is selected for authentication, the electronic device 101 (e.g., the authentication module 404) may perform an authentication operation on the basis of the selected biometric recognition method. According to one embodiment, the electronic device 101 may obtain authentication information via a biometric recognition sensor corresponding to the selected recognition method. For example, the electronic device 101 may perform an operation associated with operation 607 illustrated in FIG. 6.

When a deactivated biometric recognition method is selected for authentication, the electronic device 101 (e.g., the authentication module 404) may perform an operation for activating the selected biometric recognition method. According to one embodiment, in operation 803, the electronic device 101 may perform a user authentication operation using a pre-specified activated biometric recognition method. When the user authentication operation is completed, the electronic device 101 may output a screen for activating the selected biometric recognition method in operation 805. For example, when the deactivated biometric recognition method is selected (900) as illustrated in FIG. 9A, the electronic device 101 may output a screen 910 for storing a reference template for the selected deactivated biometric recognition method, as illustrated in FIG. 9B, or a screen for activating the selected deactivated biometric recognition method.

Figure 10:
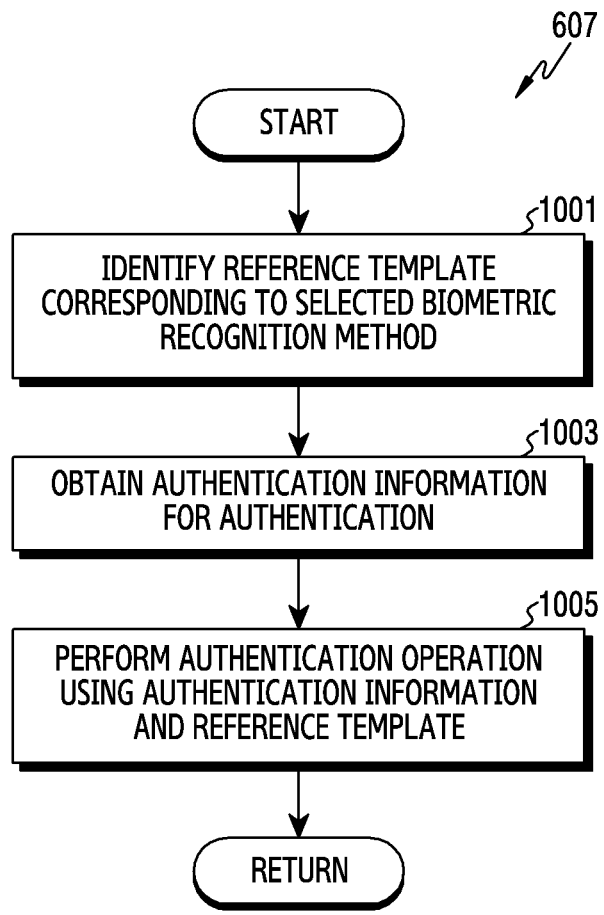
FIG. 10 is a flowchart illustrating a procedure in which an electronic device performs an authentication operation on the basis of a selected biometric recognition method according to various embodiments of the disclosure.
Figure 11:
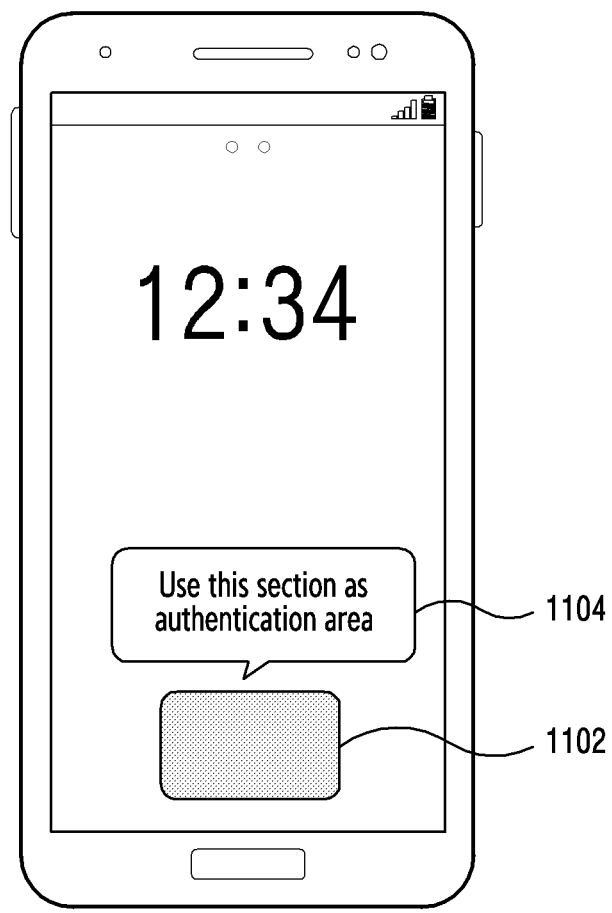
FIG. 11 shows an example illustrating an authentication operation according to various embodiments of the disclosure.

FIG. 10 is a flowchart illustrating a procedure in which the electronic device 101 (e.g., the processor 400) performs an authentication operation on the basis of a selected biometric recognition method according to various embodiments of the disclosure. FIG. 11 shows an example illustrating an authentication operation according to various embodiments of the disclosure. According to one embodiment, the procedure for performing the authentication operation may include a detailed operation of operation 607 illustrated in FIG. 6.

According to various embodiments, the electronic device 101 may output authentication suitability and may then perform an authentication operation on the basis of a biometric recognition method selected by a user.

Referring to FIG. 10, in operation 1001, the electronic device 101 (e.g., the authentication module 404) may identify a reference template corresponding to a biometric recognition method selected for authentication. The reference template may be the result of coding (or encoding) information used for authentication (e.g., an authentication image) as reference information for the selected biometric recognition method. According to one embodiment, the electronic device 101 may obtain the reference template associated with the biometric recognition method selected for authentication from among various stored reference templates corresponding to biometric recognition methods. For example, when a first biometric recognition method (e.g., an iris recognition method) is selected for authentication, the electronic device 101 may obtain a reference template obtained by coding an iris image among the stored reference templates. Further, when a second biometric recognition method (e.g., a fingerprint recognition method) is selected for authentication, the electronic device 101 may obtain a reference template obtained by coding a fingerprint image among the stored reference templates.

In operation 1003, the electronic device 101 (e.g., the authentication module 404) may obtain authentication information for authentication. According to one embodiment, the electronic device 101 may operate a biometric recognition sensor corresponding to the biometric recognition method selected for authentication to obtain authentication information. Further, the electronic device 101 may output a screen displaying guide information for guiding an object to be authenticated (e.g., a face, a finger, or an eye) to a predetermined position (e.g., the range of an angle of view (FOV) of the biometric recognition sensor). In another example, at least one biometric recognition sensor (e.g., a fingerprint sensor) may be embedded in a screen (e.g., a display). In this case, as illustrated in FIG. 11, the electronic device 101 may output guide information 1104 for guiding the object to be authenticated to a sensing area 1102 easy for authentication among sensing areas of the biometric recognition sensor included in the screen. For example, the electronic device 101 may determine at least one of an area of the sensor that is intact and an area that is not stained with foreign material as an area easy for authentication.

In operation 1005, the electronic device 101 (e.g., the authentication module 404) may perform an authentication operation using the authentication information and the reference template. According to one embodiment, the reference template may be coded (or encoded) data. Accordingly, the electronic device 101 may generate an authentication template by coding (or encoding) the obtained authentication information. Further, the electronic device 101 may perform an authentication operation by comparing the authentication template with the reference template.

Figure 12:
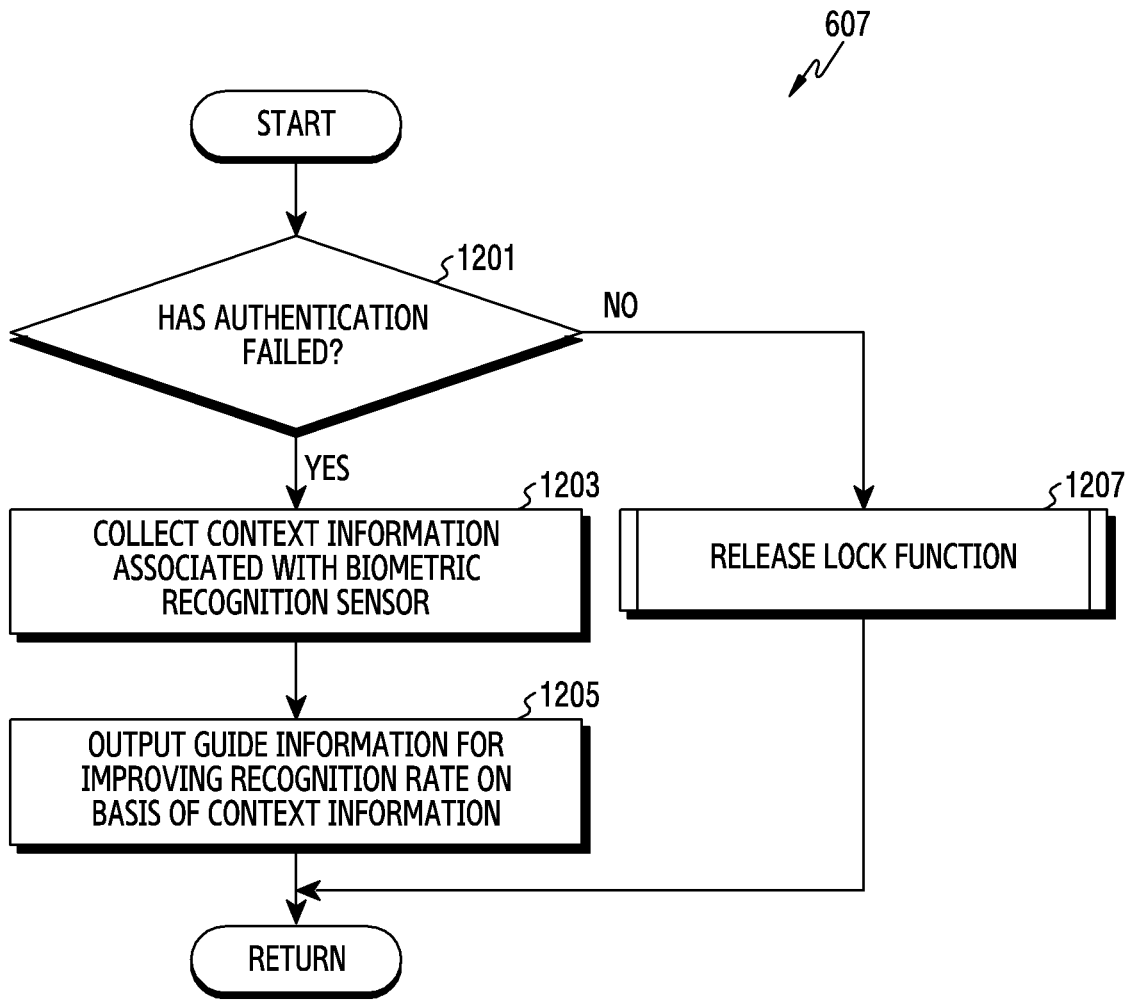
FIG. 12 is a flowchart illustrating a procedure in which an electronic device performs an authentication operation on the basis of a selected biometric recognition method according to various embodiments of the disclosure.
Figure 13:
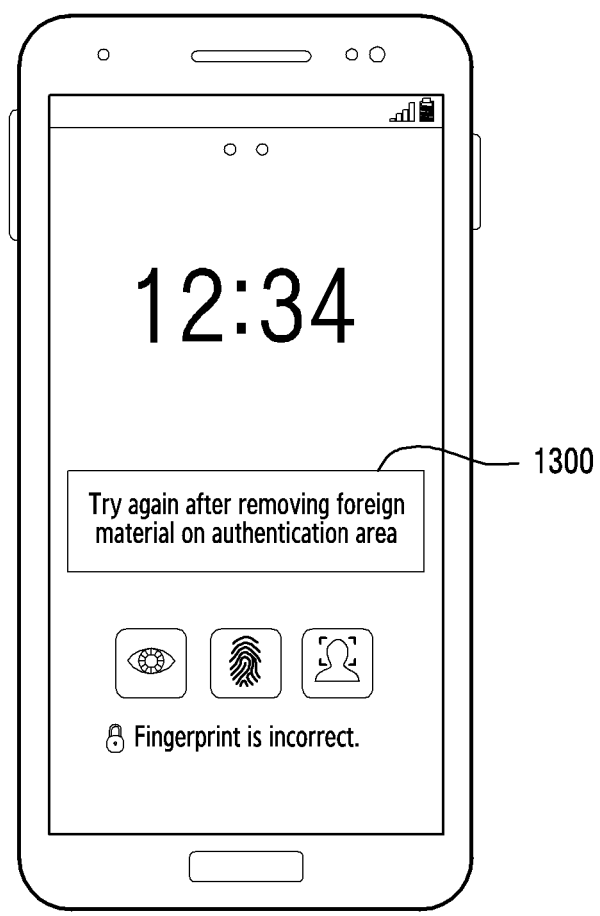
FIG. 13 shows an example illustrating a procedure for performing an authentication operation according to various embodiments of the disclosure.

FIG. 12 is a flowchart illustrating a procedure in which the electronic device 101 (e.g., the processor 400) performs an authentication operation on the basis of a selected biometric recognition method according to various embodiments of the disclosure. FIG. 13 shows an example illustrating a procedure for performing an authentication operation according to various embodiments of the disclosure. According to one embodiment, the procedure for performing the authentication operation may include a detailed operation of operation 607 illustrated in FIG. 6.

According to various embodiments, the electronic device 101 may output guide information for improving the recognition rate for at least one biometric recognition sensor that has failed in user authentication.

Referring to FIG. 12, in operation 1201, the electronic device 101 (e.g., the authentication module 404) may identify the result of an authentication operation. According to one embodiment, the electronic device 101 may determine whether there is a certain level of similarity between authentication information obtained by a selected biometric recognition method and a stored reference template. For example, when it is determined that the authentication information has a certain level of similarity to the reference template, the electronic device 101 may determine that authentication is successful. When it is determined that the authentication information does not have the certain level of similarity to the reference template, the electronic device 101 may determine that the authentication has failed.

When the authentication fails, the electronic device 101 (e.g., the determination module 402) may collect context information associated with a biometric recognition sensor that has performed the authentication operation in operation 1203. According to one embodiment, the electronic device 101 may collect the context information while obtaining the authentication information via the biometric recognition sensor.

In operation 1205, the electronic device 101 (e.g., the determination module 402) may output guide information for improving the recognition rate on the basis of the context information. According to one embodiment, the electronic device 101 may determine a negative environmental factor that has affected the biometric recognition sensor (e.g., a biometric recognition sensor used for authentication) and may output guide information on the basis of the determination result. For example, the electronic device 101 may define guide information corresponding to a negative environmental factor as shown in Table 1.

TABLE 1

| Environmental factor | Guide information |
|---|---|
| Illuminance above reference value | Move to the dark |
| Illuminance below reference value | Move to the light |
| Orientation of electronic device out of reference value | Move electronic device toward face |
| Foreign material (or moisture) | Remove foreign material on sensor or body part |
| Noise above reference value | Remove noise |
| Noise below reference value | Remove vibrations |

For example, when it is determined that authentication information unsuitable for authentication is obtained due to ambient illuminance, the electronic device 101 may output guide information indicating a move to a place brighter or darker than a current brightness. When it is determined that authentication information unsuitable for authentication is obtained due to the presence of foreign material on an object or the biometric recognition sensor, as illustrated in FIG. 13, the electronic device 101 may output (1300) guide information indicating removal of foreign material.

When the authentication is successful, the electronic device 101 (e.g., the processor 400) may release a lock function in operation 1207.

Figure 14:
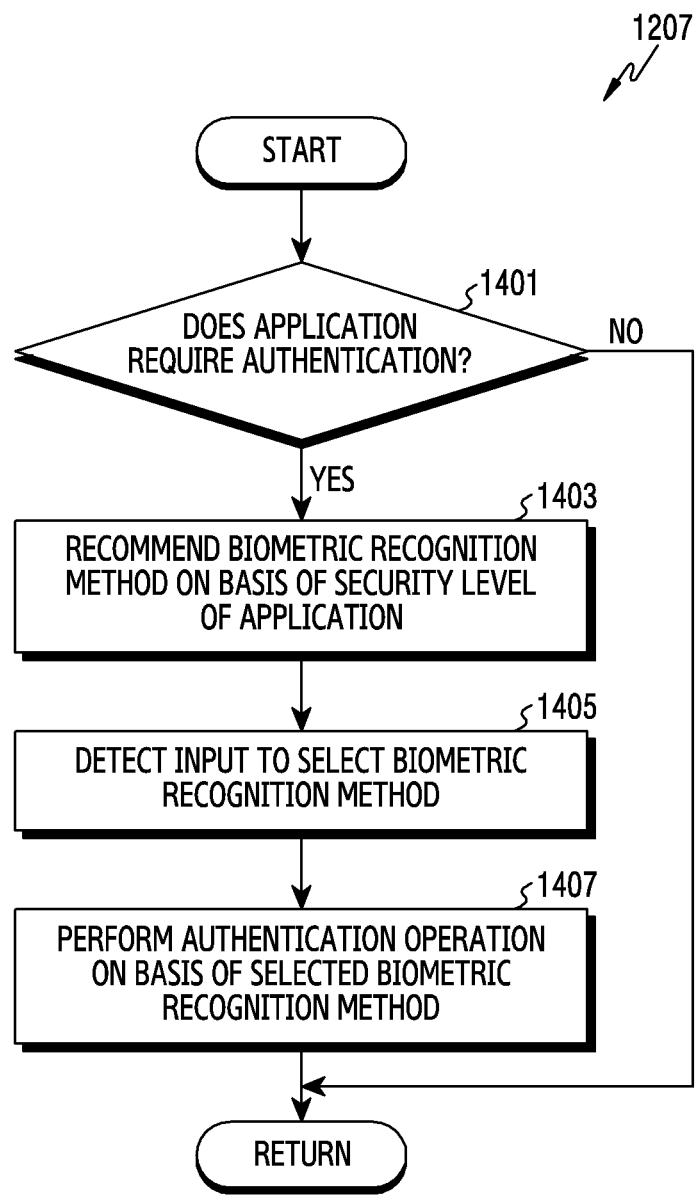
FIG. 14 is a flowchart illustrating a procedure in which an electronic device performs an authentication operation for an application according to various embodiments of the disclosure.
Figure 15A:
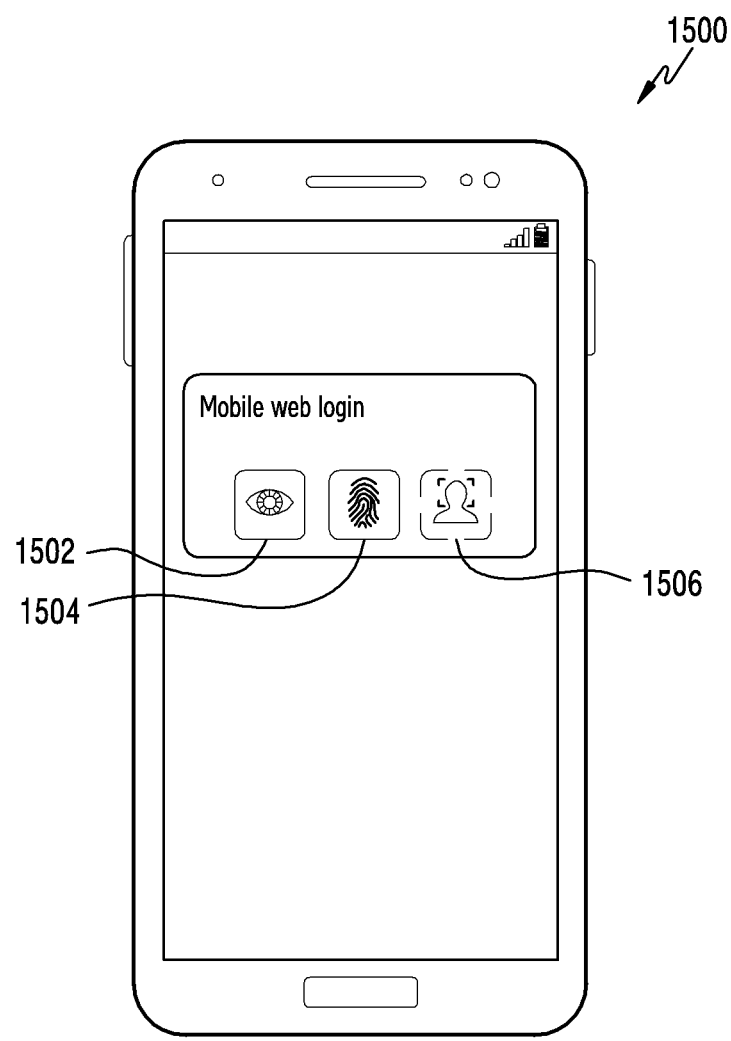
FIG. 15A and FIG. 15B show examples illustrating a procedure for performing an authentication operation according to various embodiments of the disclosure.
Figure 15B:
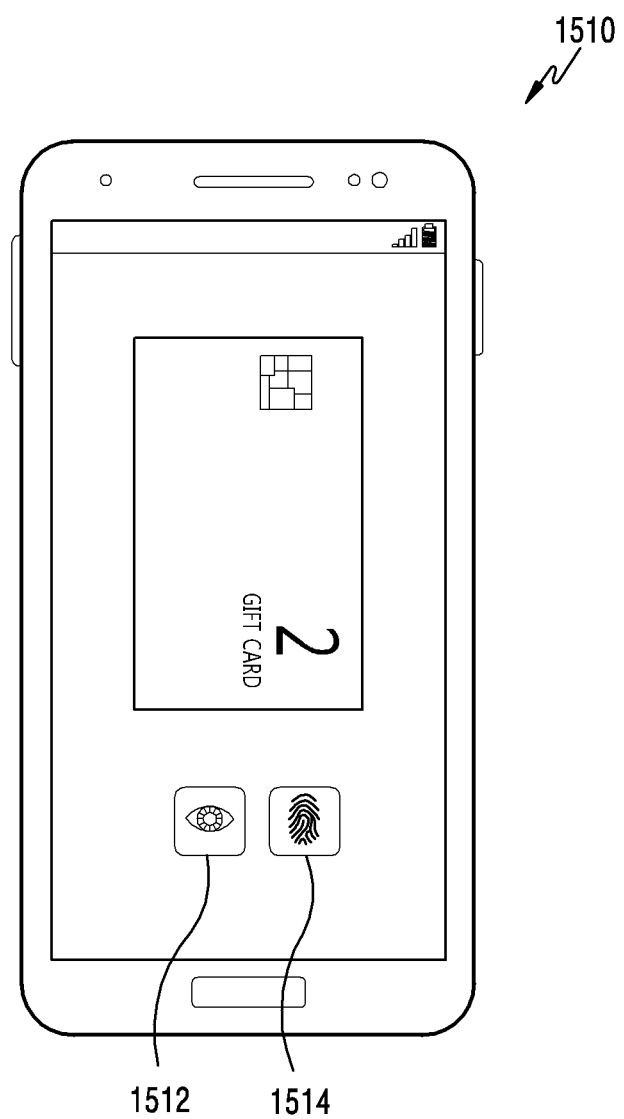

FIG. 14 is a flowchart illustrating a procedure in which the electronic device 101 (e.g., processor 400) performs an authentication operation for an application according to various embodiments of the disclosure. FIG. 15A and FIG. 15B show examples illustrating a procedure for performing an authentication operation according to various embodiments of the disclosure. According to one embodiment, the procedure for performing the authentication operation may include a detailed operation of operation 1207 illustrated in FIG. 12.

According to various embodiments, the electronic device 101 may recommend a biometric recognition method on the basis of the characteristics of an application when user authentication is required during execution of the application.

Referring to FIG. 14, in operation 1401, the electronic device 101 (e.g., the processor 400) may execute at least one application in a state where a lock function is released (e.g., an unlocked state). Further, the electronic device 101 may determine whether user authentication is required upon execution of the application or during execution of the application. According to one embodiment, the electronic device 101 may determine whether a screen accessible only by an authenticated user (e.g., a payment screen or a personal information input screen) is output when the application is executed.

When authentication is not required, the electronic device 101 (e.g., the processor 400) may remain locked. According to one embodiment, the electronic device 101 may maintain execution of the application.

When authentication is required, the electronic device 101 (e.g., the processor 400, the determination module 402, or the output control module 406) may recommend a biometric recognition method on the basis of the security level of the executed application in operation 1403. According to one embodiment, as illustrated in FIG. 15A, when an application (e.g., a web browser) having a first security level (e.g., a low security level) is executed, the electronic device 101 may recommend (1500) a biometric recognition method (e.g., an iris recognition method 1502, a fingerprint recognition method 1504, and a face recognition method 1506) corresponding to a first group as an authentication method. For example, the biometric recognition method corresponding to the first group may be any biometric recognition method supported by the electronic device 101. As illustrated in FIG. 15B, an application (e.g., a banking application) having a second security level (e.g., a high security level) is executed, the electronic device 101 may recommend (1510) a biometric recognition method (e.g., an iris recognition method 1512 or a fingerprint recognition method 1514) corresponding to a second group as an authentication method. For example, the biometric recognition method corresponding to the second group may include a biometric recognition method having a certain security level. For example, the electronic device 101 may provide the biometric recognition method corresponding to the second group excluding a biometric recognition method (e.g., a face recognition method) having a security level lower than the certain level as a recommended authentication method.

In operation 1405, the electronic device 101 (e.g., the determination module 402 or the authentication module 404) may detect input to select a biometric recognition method. According to one embodiment, the electronic device 101 may detect input to select at least one biometric recognition method for authentication (e.g., unlocking) among recommended authentication methods.

In operation 1407, the electronic device 101 (e.g., the authentication module 404) may perform an authentication operation on the basis of at least one selected biometric recognition method. According to one embodiment, the electronic device 101 may obtain authentication information using a biometric recognition sensor corresponding to the at least one selected biometric recognition method. Further, the electronic device 101 may perform an authentication operation of comparing the authentication information obtained using the biometric recognition sensor with a stored reference template.

Figure 16:
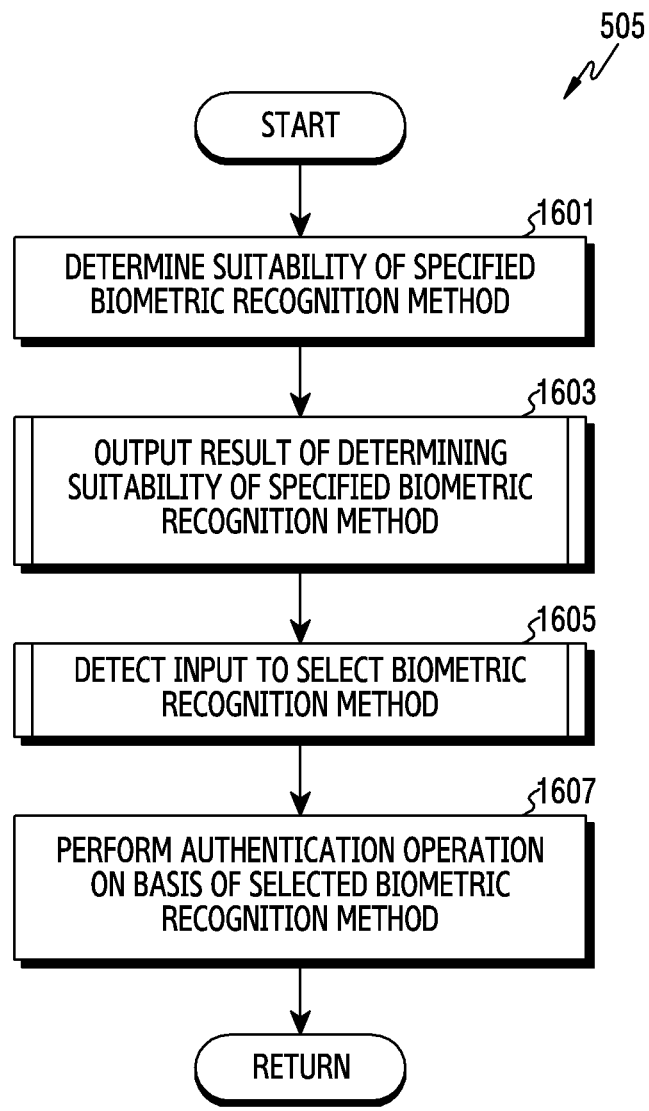
FIG. 16 is a flowchart illustrating a procedure for performing an authentication operation of an electronic device according to various embodiments of the disclosure.
Figure 17:
FIG. 17 shows an example illustrating a procedure for performing an authentication operation according to various embodiments of the disclosure.

FIG. 16 is a flowchart illustrating a procedure for performing an authentication operation of an electronic device 101 (e.g., the processor 400) according to various embodiments of the disclosure. FIG. 17 shows an example illustrating a procedure for performing an authentication operation according to various embodiments of the disclosure. According to one embodiment, the procedure for performing the authentication operation may include a detailed operation of operation 505 illustrated in FIG. 5.

According to various embodiments, the electronic device 101 may output the authentication suitability of a pre-specified activated biometric recognition method and may select a biometric recognition method to use for an authentication operation on the basis of user input.

Referring to FIG. 16, in operation 1601, the electronic device 101 (e.g., the determination module 402) may determine the authentication suitability of a pre-specified activated biometric recognition method. According to one embodiment, the electronic device 101 may determine the authentication suitability on the basis of context information associated with the pre-specified activated biometric recognition method. For example, operation 1601 is different from operation 601 of FIG. 6 in that the authentication suitability of a deactivated biometric recognition method is not determined.

In operation 1603, the electronic device 101 (e.g., the output control module 406) may output the authentication suitability of the activated biometric recognition method. According to one embodiment, the electronic device 101 may output the authentication suitability so that a user can recognize an activated biometric recognition method suitable for authentication and an activated biometric recognition method unsuitable for authentication before an authentication operation is performed. For example, the electronic device 101 may output an object corresponding to the activated biometric recognition method. In addition, the electronic device 101 may distinguish a biometric recognition method having a certain level of authentication suitability from a biometric recognition method not having the certain level of authentication suitability on the basis of the authentication suitability. For example, as illustrated in FIG. 17, the electronic device 101 may apply authentication suitability to each activated biometric recognition method, thereby distinguishing an activated biometric recognition method having high authentication suitability (e.g., an iris recognition method 1702 or a fingerprint authentication method 1704) from a biometric recognition method having low authentication suitability (e.g., a face recognition method 1706) (1700).

In operation 1605, the electronic device 101 (e.g., the processor 400 or the determination module 402) may detect input to select a biometric recognition method. According to one embodiment, the electronic device 101 may determine a biometric recognition method to use for authentication among activated biometric recognition methods on the basis of the input.

In operation 1607, the electronic device 101 (e.g., the authentication module 404) may perform an authentication operation on the basis of the selected biometric recognition method.

Figure 18:
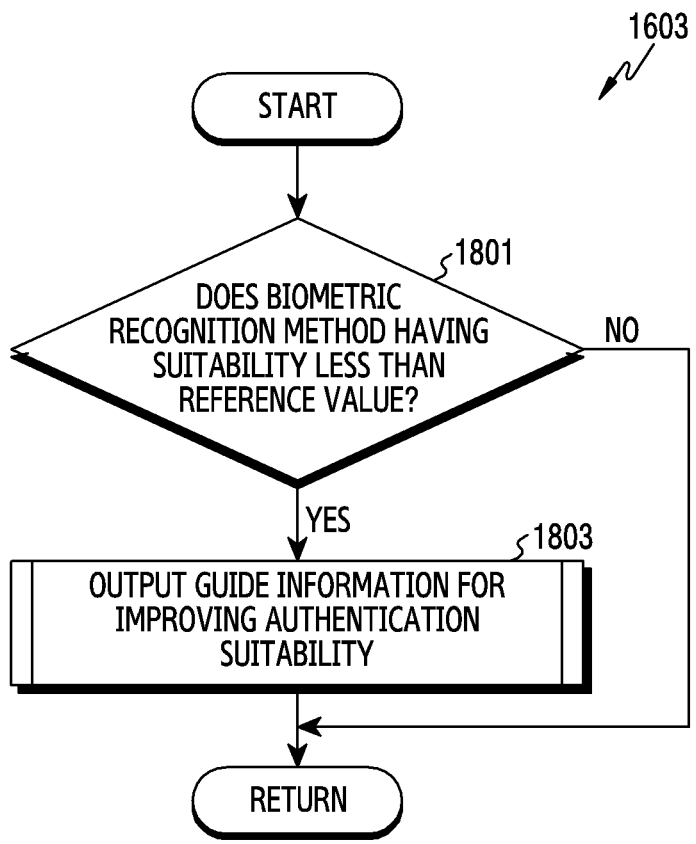
FIG. 18 is a flowchart illustrating a procedure in which an electronic device outputs authentication suitability according to various embodiments of the disclosure.
Figure 19:
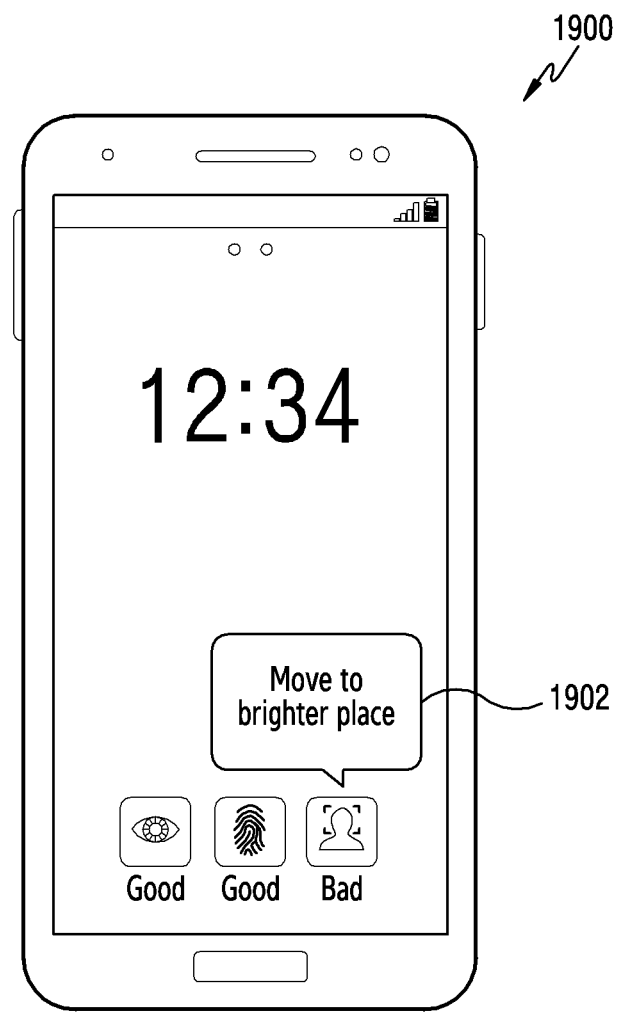
FIG. 19 shows an example illustrating a procedure for outputting authentication suitability according to various embodiments of the disclosure.

FIG. 18 is a flowchart illustrating a procedure in which the electronic device 101 (e.g., the processor 400) outputs authentication suitability according to various embodiments of the disclosure. FIG. 19 shows an example illustrating a procedure for outputting authentication suitability according to various embodiments of the disclosure. According to one embodiment, the procedure for outputting the authentication suitability may include a detailed operation of operation 1603 illustrated in FIG. 16.

According to various embodiments, the electronic device 101 may provide guide information for improving authentication suitability for a biometric recognition method by which unsuitable authentication information may be obtained.

Referring to FIG. 18, in operation 1801, the electronic device 101 (e.g., the determination module 402) may determine whether there is an activated biometric recognition method having an authentication suitability less than a reference value among activated biometric recognition methods on the basis of authentication suitability. According to one embodiment, the electronic device 101 may determine whether there is a biometric recognition method by which unsuitable authentication information may be obtained among the activated biometric recognition methods.

When it is determined that there is no activated biometric recognition method having an authentication suitability less than the reference value, the electronic device 101 (e.g., the output control module 406) may perform an operation of outputting the authentication suitability of an activated biometric recognition method. According to one embodiment, the electronic device 101 may perform an operation associated with operation 1603 illustrated in FIG. 16.

When it is determined that there is an activated biometric recognition method having an authentication suitability less than the reference value, the electronic device 101 (e.g., the output control module 406) may output guide information for improving authentication suitability in operation 1803. According to one embodiment, the electronic device 101 may determine a negative environmental factor that affects the biometric recognition method and may output guide information on the basis of the determination result. For example, the electronic device 101 may output guide information for reducing a negative environmental factor for a biometric recognition method by which unsuitable authentication information may be obtained. For example, the electronic device 101 may determine, on the basis of at least one sensor, that the external illuminance of the electronic device 101 (e.g., illuminance less than a reference brightness) affects a biometric recognition method. Accordingly, as illustrated in FIG. 19, the electronic device 101 may output (1900) guide information 1902 for inducing an illuminance change in order to improve authentication suitability.

Figure 20:
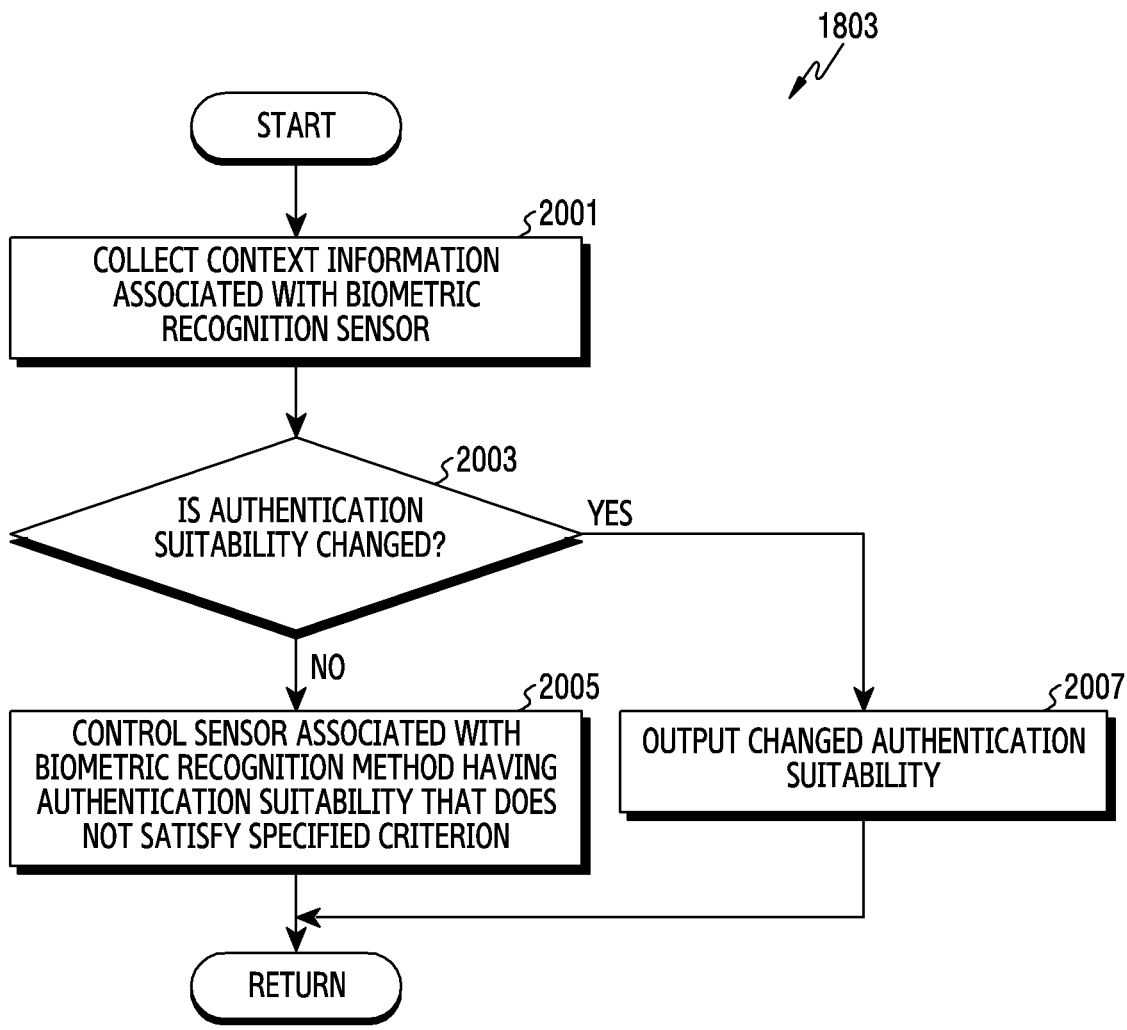
FIG. 20 is a flowchart illustrating a procedure in which an electronic device outputs guide information for improving authentication suitability according to various embodiments of the disclosure.

FIG. 20 is a flowchart illustrating a procedure in which the electronic device 101 (e.g., the processor 400) outputs guide information for improving authentication suitability according to various embodiments of the disclosure. According to one embodiment, the procedure for outputting the guide information may include a detailed operation of operation 1803 illustrated in FIG. 18.

According to various embodiments, the electronic device 101 may control the operation of the electronic device 101 in connection with a biometric recognition method that is not improved in authentication suitability. According to one embodiment, the electronic device 101 may control the operation of a biometric recognition sensor associated with a biometric recognition method that is not improved in authentication suitability, thereby reducing battery consumption.

Referring to FIG. 20, in operation 2001, with guide information for improving authentication suitability output, the electronic device 101 (e.g., the determination module 402) may collect context information associated with a biometric recognition method by which unsuitable authentication information may be obtained on the basis of at least one sensor. According to one embodiment, the electronic device 101 may re-determine the authentication suitability of the biometric recognition method determined as a method by which unsuitable authentication information may be obtained on the basis of the collected context information.

In operation 2003, the electronic device 101 (e.g., the determination module 402) may determine whether the authentication suitability of the biometric recognition method determined as a method by which unsuitable authentication information may be obtained is changed. According to one embodiment, the electronic device 101 may determine whether the authentication suitability of the biometric recognition method determined as a method by which unsuitable authentication information may be obtained is improved.

When the authentication suitability is changed, the electronic device 101 (e.g., the output control module 406) may determine that the authentication suitability is improved and may output the changed authentication suitability in operation 2007. According to one embodiment, the electronic device 101 may change the biometric recognition method determined as a method by which unsuitable authentication information may be obtained to an activated biometric recognition method having high authentication suitability.

When the authentication suitability is not changed, the electronic device 101 (e.g., the processor 400) may determine that the authentication suitability is not improved and may control the operation of a biometric recognition sensor associated with the biometric recognition method determined as a method by which unsuitable authentication information may be obtained in operation 2005. According to one embodiment, the electronic device 101 may change the operation cycle of the biometric recognition sensor or may stop the operation of the biometric recognition sensor. For example, the electronic device 101 may control the operation of the biometric recognition sensor, thereby reducing battery consumption.

Figure 21:
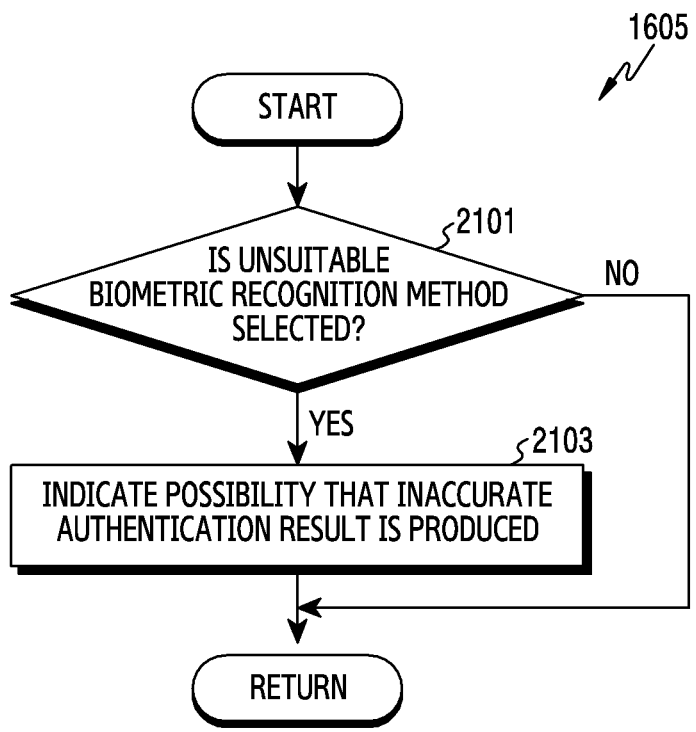
FIG. 21 is a flowchart illustrating a procedure in which an electronic device determines a biometric recognition method to use for authentication according to various embodiments of the disclosure.
Figure 22A:
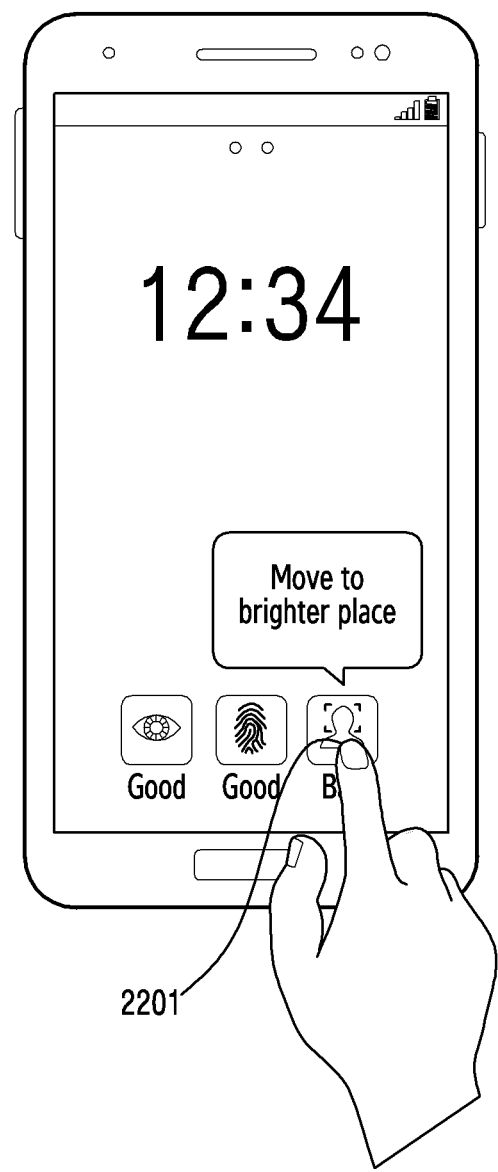
FIG. 22A and FIG. 22B show examples illustrating a procedure for changing a biometric recognition method according to various embodiments of the disclosure.
Figure 22B:
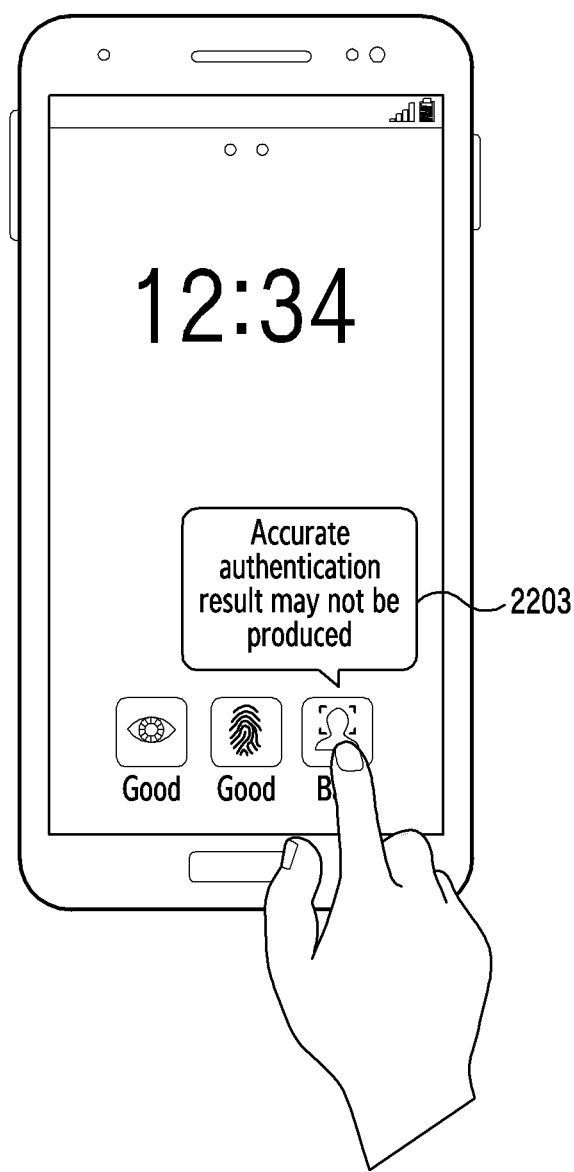

FIG. 21 is a flowchart illustrating a procedure in which the electronic device 101 (e.g., the processor 400) determines a biometric recognition method to use for authentication according to various embodiments of the disclosure. FIG. 22A and FIG. 22B show examples illustrating a procedure for changing a biometric recognition method according to various embodiments of the disclosure. According to one embodiment, the procedure for determining the biometric recognition method to use for authentication may include a detailed operation of operation 1605 illustrated in FIG. 16.

According to various embodiments, the electronic device 101 may predict the authentication accuracy of a biometric recognition method selected for authentication.

Referring to FIG. 21, in operation 2101, the electronic device 101 (e.g., the determination module 402) may determine whether a biometric recognition method by which unsuitable authentication information may be obtained is selected for authentication. According to one embodiment, the electronic device 101 may determine whether a biometric recognition method having an authentication suitability less than a reference value is selected for authentication.

When a biometric recognition method by which suitable authentication information can be obtained is selected, the electronic device 101 (e.g., the authentication module 404) may perform an authentication operation on the basis of the selected biometric recognition method. According to one embodiment, the electronic device 101 may perform an operation associated with operation 1607 illustrated in FIG. 16.

When a biometric recognition method by which unsuitable authentication information may be obtained is selected, the electronic device 101 (e.g., the output control module 406) may indicate that an inaccurate authentication result may be produced by the selected biometric recognition method in operation 2103. According to one embodiment, when a biometric recognition method by which unsuitable authentication information may be obtained (2201) due to external illuminance (e.g., illuminance less than a reference brightness) as illustrated in FIG. 22A, the electronic device may output guide information 2203 indicating that unsuitable authentication information may be produced due to external illuminance as illustrated in FIG. 22B. Further, when a new biometric recognition method is selected after indicating that an inaccurate authentication result may be produced, the electronic device 101 may perform an authentication operation using the selected biometric recognition method. When a new biometric recognition method is not selected, the electronic device 101 may perform an authentication operation using an already selected biometric recognition method.

Figure 23:
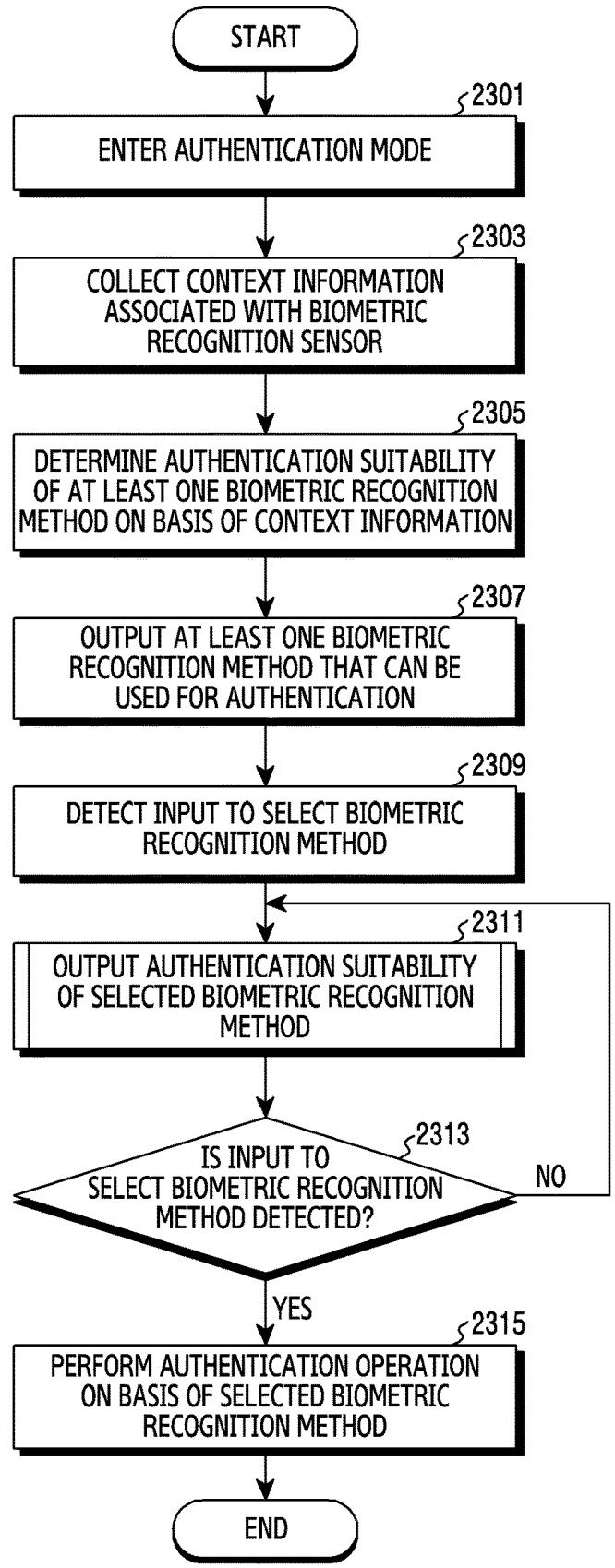
FIG. 23 is a flowchart illustrating another procedure for performing an authentication operation of an electronic device according to various embodiments of the disclosure.
Figure 25A:
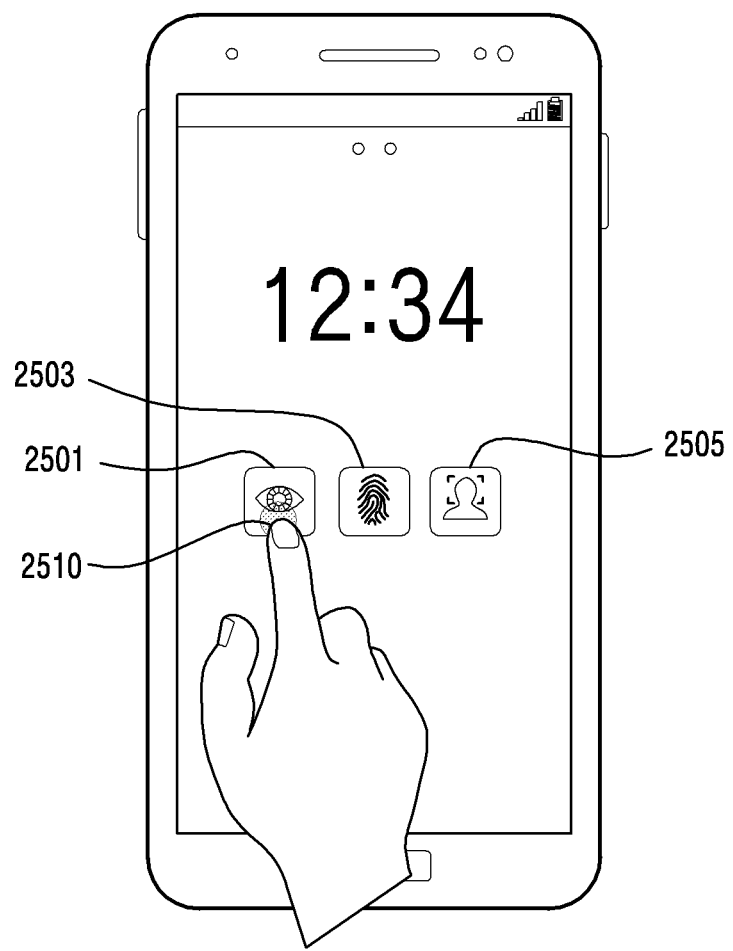
FIG. 25A to FIG. 25C show examples illustrating an authentication operation according to various embodiments of the disclosure.
Figure 25B:
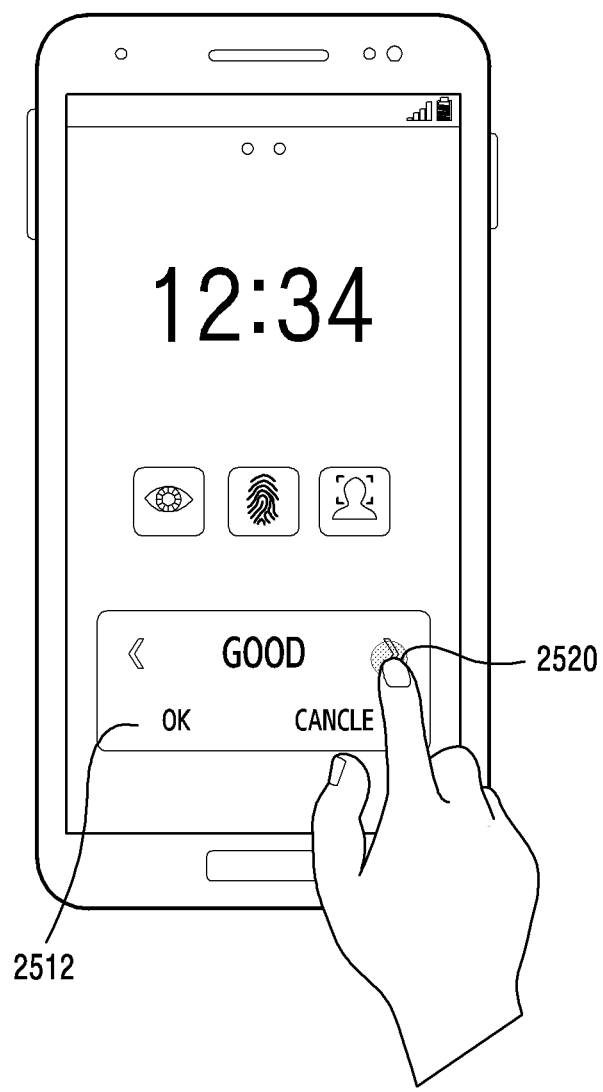

FIG. 23 is a flowchart illustrating another procedure for performing an authentication operation of the electronic device 101 (e.g., the processor 400) according to various embodiments of the disclosure. FIG. 25A and FIG. 25B show examples illustrating an authentication operation according to various embodiments of the disclosure.

Referring to FIG. 23, in operation 501, the electronic device 101 (e.g., the output control module 406) may enter an authentication mode. According to one embodiment, the electronic device 101 may enter the authentication mode by outputting a screen for requesting an authentication operation. For example, the electronic device 101 may enter the authentication mode on the basis of user input (e.g., wake-up input) in a lock function-enabled state (sleep state or lock state).

In operation 2303, the electronic device 101 (e.g., the determination module 402) may collect context information associated with a biometric recognition method (or biometric recognition sensor) used for authentication on the basis of at least one sensor. According to one embodiment, when a plurality of biometric recognition methods (e.g., a face recognition method, an iris recognition method, a fingerprint recognition method, and the like) may be used for authentication, the electronic device 101 may collect context information associated with each biometric recognition method. For example, the electronic device 101 may collect context information associated with at least one of external illuminance information of the electronic device 101, orientation and movement information about the electronic device 101, and operation state information of the biometric recognition sensor.

In operation 2305, the electronic device 101 (e.g., the determination module 402) may determine the authentication suitability of a biometric recognition method that can be used for authentication on the basis of the collected context information. According to one embodiment, authentication suitability may be a value indicating the degree to which a biometric recognition method is suitable to be used for user authentication.

In operation 2307, the electronic device 101 (e.g., the output control module 406) may output at least one biometric recognition method that can be used for authentication. According to one embodiment, the electronic device 101 may output a screen displaying an object corresponding to the at least one biometric recognition method that can be for authentication. For example, as illustrated in FIG. 25A, the electronic device 101 may output an object 2501 corresponding to an iris recognition method available for authentication, an object 2503 corresponding to a fingerprint recognition method, or an object 2505 corresponding to a face recognition method.

In operation 2309, the electronic device 101 (e.g., the determination module 402 or the processor 400) may detect input to select a biometric recognition method to use for authentication. According to one embodiment, the electronic device 101 may detect input to select one of the objects output on the screen.

In operation 2311, the electronic device 101 (e.g., the output control module 402) may output the authentication suitability of a selected biometric recognition method. According to one embodiment, when input 2510 to select the object corresponding to the iris recognition method among the output objects is detected as illustrated in FIG. 25A, the electronic device 101 may output the authentication suitability 2512 corresponding to the object selected by the user on the screen as illustrated in FIG. 25B.

In operation 2313, the electronic device 101 (e.g., the processor 400 or the determination module 402) may identify detected input while outputting the authentication suitability of the selected biometric recognition method. According to one embodiment, the input may include input to select another biometric recognition method for performing an authentication operation. The input may also include input to perform an authentication operation using the selected biometric recognition method.

Upon detecting the input to perform the authentication operation using the selected biometric recognition method, the electronic device 101 (e.g., the authentication module 404) may perform an authentication operation on the basis of the selected biometric recognition method in operation 2315.

Figure 24:
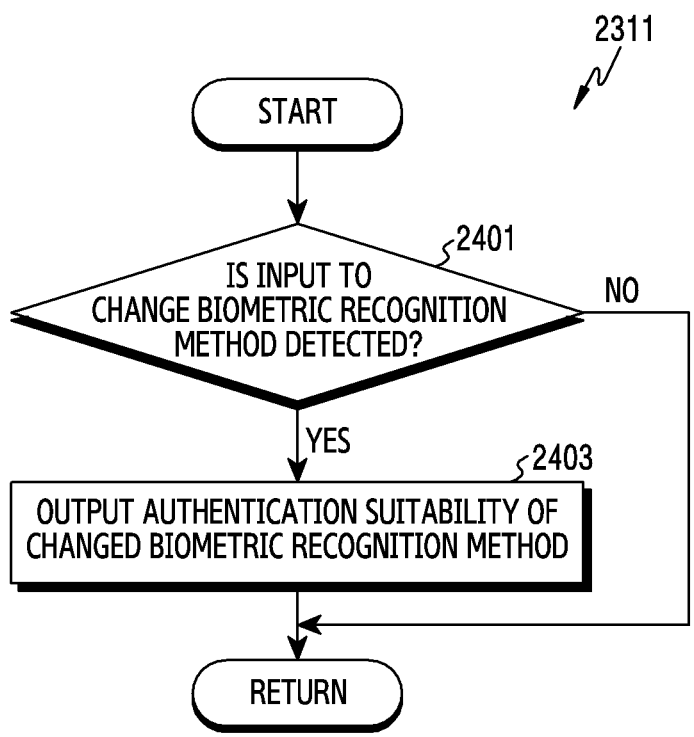
FIG. 24 is a flowchart illustrating a procedure in which an electronic device detects user input while outputting authentication suitability according to various embodiments of the disclosure.
Figure 25C:
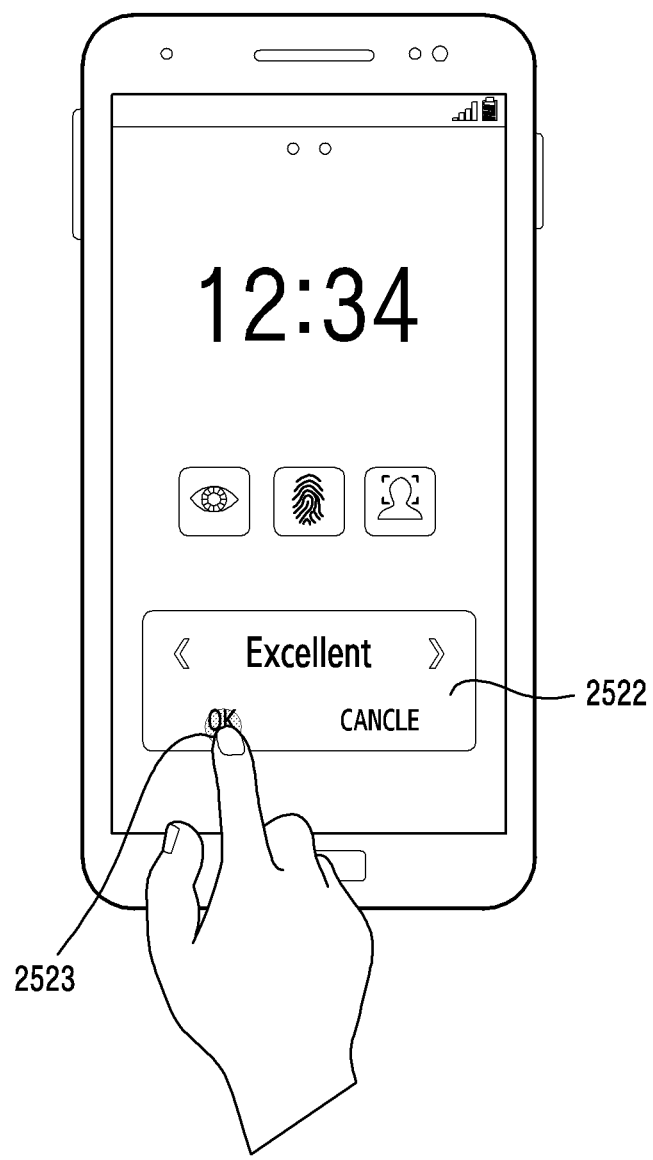

FIG. 24 is a flowchart illustrating a procedure in which the electronic device 101 (e.g., the processor 400) detects user input while outputting authentication suitability according to various embodiments of the disclosure. FIG. 25B and FIG. 25C show examples illustrating an authentication operation according to various embodiments of the disclosure. According to one embodiment, the procedure for detecting the user input may include a detailed operation of operation 2311 illustrated in FIG. 23.

In operation 2401, the electronic device 101 (e.g., the processor 400 or the determination module 402) may determine whether input to select a different biometric recognition method is detected. According to one embodiment, the electronic device 101 may determine whether input to request the authentication suitability of a different biometric recognition method is detected.

When input to select a different biometric recognition method is detected, the electronic device 101 (e.g., the output control module 406) may output the authentication suitability of the different biometric recognition method in operation 2403. According to one embodiment, upon detecting input 2520 to change a biometric recognition method as illustrated in FIG. 25B, the electronic device 101 may output the authentication suitability 2522 of a changed biometric recognition method as illustrated in FIG. 25C. In addition, upon detecting input 2523 to perform an authentication operation using a different selected biometric recognition method, the electronic device 101 may perform an authentication operation accordingly.

An operating method of an electronic device according to various embodiments of the disclosure may include: obtaining context information associated with a first biometric recognition method and a second biometric recognition method; identifying a first success rate, at which authentication is successful with biometric information to be obtained via the first biometric recognition method, and a second success rate, at which authentication is successful with biometric information to be obtained via the second biometric recognition method, on the basis of at least part of the context information; and displaying a graphic object corresponding to the first method and a graphic object corresponding to the second method on the basis of at least part of the first success rate and the second success rate.

According to one embodiment, the displaying of the graphic object may include displaying guide information for enabling at least one success rate which does not satisfy a specified value among the first success rate and the second success rate to satisfy the specified value.

According to one embodiment, the context information may be associated with at least one of external environment information of the electronic device, movement information of the electronic device, orientation information of the electronic device, and an operation state of the first biometric sensor and the second biometric sensor. For example, the environment information may include illuminance information.

According to one embodiment, the operating method may further include authenticating a user using the first method or the second method selected via the graphic objects.

According to one embodiment, the authenticating of the user may include: storing a first reference template associated with the first method and a second reference template associated with the second method; and obtaining a reference template corresponding to the selected method from among the stored reference templates.

According to one embodiment, the authenticating of the user may include displaying notification information when the first method or the second method which does not satisfy a specified success rate is used for authentication.

According to one embodiment, the authenticating of the user may include: obtaining context information associated with the first method or the second method by which authentication fails; and displaying guide information for improving a success rate on the basis of at least part of the context information.

An electronic device and an operating method thereof according to various embodiments of the disclosure may provide the recognition rate of a biometric recognition method on the basis of context information or may recommend a biometric recognition suitable for an authentication operation, thereby improving the user recognition rate of the electronic device.

Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:

1. An electronic device comprising:
a first biometric sensor configured to obtain biometric information using a first biometric recognition method;
a second biometric sensor configured to obtain the biometric information or different biometric information using a second biometric recognition method;
a display; and
a processor,
wherein the processor is configured to:
obtain context information associated with the first biometric recognition method and the second biometric recognition method respectively,
determine authentication suitability levels of the first biometric recognition method and the second biometric recognition method respectively based on the context information,
display a first graphic object corresponding to the first biometric recognition method and a second graphic object corresponding to the second biometric recognition method respectively based on the authentication suitability levels, wherein a graphic object corresponding to a biometric recognition method having a predetermined level of authentication suitability is displayed to be distinguished from a graphic object corresponding to a biometric recognition method not having the predetermined level of authentication suitability,
detect an input for selecting a graphic object of the first graphic object and the second graphic object,
in response to the selected graphic object corresponding to the biometric recognition method having the predetermined level of authentication suitability, perform an authentication operation using the biometric recognition method having the predetermined level of authentication suitability, and
in response to the selected graphic object corresponding to the biometric recognition method not having the predetermined level of authentication suitability, display first guide information indicating that unsuitable authentication information can be produced.

2. The electronic device as claimed in claim 1, wherein the processor is configured to determine the authentication suitability levels of the first biometric recognition method and the second biometric recognition method by identifying a first success rate, at which authentication is successful with the biometric information to be obtained via the first biometric recognition method, and a second success rate, at which authentication is successful with the biometric information or the different biometric information to be obtained via the second biometric recognition method, based on the context information.

3. The electronic device as claimed in claim 1, wherein the processor is further configured to display second guide information for enabling the biometric recognition method not having the predetermined level of authentication suitability to satisfy the predetermined level of authentication suitability.

4. The electronic device as claimed in claim 1, wherein the processor is further configured to obtain the context information associated with at least one of external environment information of the electronic device, movement information of the electronic device, orientation information of the electronic device, and an operation state of the first biometric sensor and the second biometric sensor.

* * * * *